April 28, 1964   F. C. HALLDEN   3,131,294
ELECTRONIC CALCULATING MACHINE
Filed June 3, 1960   6 Sheets-Sheet 3

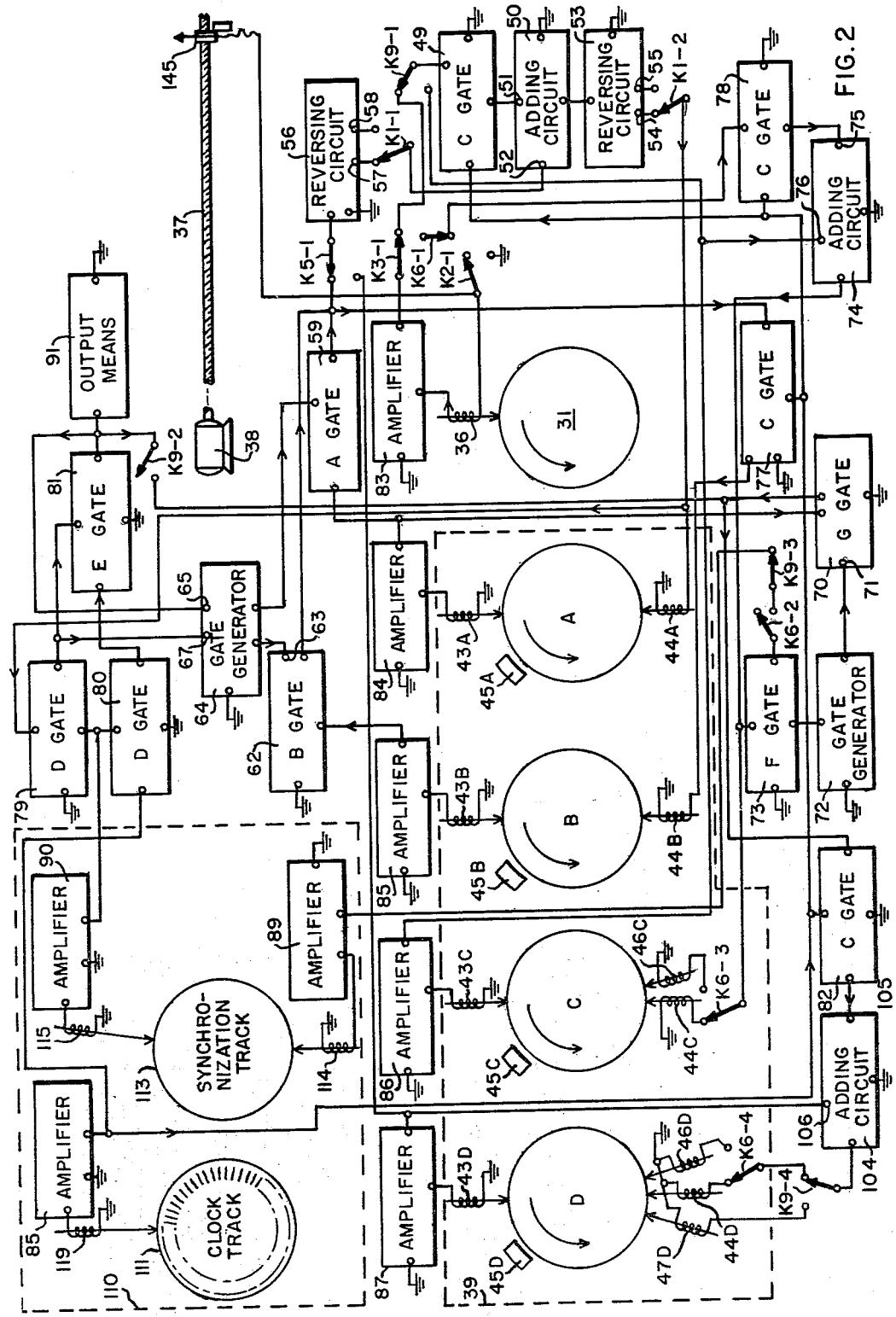

April 28, 1964     F. C. HALLDEN     3,131,294
ELECTRONIC CALCULATING MACHINE
Filed June 3, 1960                    6 Sheets-Sheet 6

United States Patent Office 3,131,294
Patented Apr. 28, 1964

3,131,294
ELECTRONIC CALCULATING MACHINE
Frederick C. Hallden, Floral Park, N.Y., assignor to Hazeltine Research, Inc., a corporation of Illinois
Filed June 3, 1960, Ser. No. 33,825
30 Claims. (Cl. 235—167)

*General*

This invention relates to a calculating machine for performing arithmetical operations. The principles embodied in this invention are particularly suited to the construction of an inexpensive portable desk-type calculator. This application is a continuation-in-part of application Serial No. 679,580, filed August 22, 1957, now abandoned.

In contrast to the many widely used desk calculators which are substantially mechanical devices, the present invention pertains to a calculator in which the arithmetical operations are performed by electronic circuitry. In designing a calculator utilizing electronic calculating means, the number of mechanical parts is kept to a minimum. This particular feature is important from the standpoint of maintenance and reliability of a desk calculator. Conventional mechanical desk calculators are complex systems consisting of hundreds of moving parts. Every calculation involves the accurate positioning of many of these parts and in a critical sequence. In order to achieve reliability, the manufacturing tolerances to which these parts were manufactured must be strictly adhered to. For this reason, the maintenance and down time on mechanical calculators have been known to be excessive.

A further limitation of the conventional mechanical desk calculator is its inability to operate at high speeds because the machinery depends on the positioning of mechanical gears, cams, and wheels.

A still further limitation of mechanical machines is their inflexibility. In most applications, a machine is a self-contained unit in which a problem is inserted, usually on a hand keyboard, and an answer obtained either printed or as a series of digits appearing on the face of the machine. Most machines are incapable of receiving information other than by manual insertion on a keyboard. They are also incapable of translating the answer for use by other office machines. Those that have been designed to remedy these limitations require the addition of complex and expensive equipment to accomplish the required results.

The present invention recognizes the above-described limitations and is capable of eliminating or minimizing them. For example, a desk calculator in which the arithmetical operations are performed by electronic circuitry requires a minimum of moving parts which are subject to wear and tear. If in addition the electronic circuits are designed around transistors, a higher degree of reliability and long life may be obtained. In the present invention, the moving mechanical parts are limited to fewer than six elements, excluding relays. On the other hand, an electronic calculator is limited in its speed of operation by the few necessary mechanical elements employed. No known practical mechanical system can approach the speed with which information may be translated electronically.

On the question of flexibility, an electronic calculating machine is inherently capable of receiving input information from both a standard manual keyboard or electrical signals derived from other office equipment. Since information is translated by electrical signals, a simple switching operation will provide manual and external inputs. Accordingly, the answer is also inherently capable of being printed or recorded on the machine itself or it may be extracted as an electronic signal and translated for use by other office machinery. For example, an answer may be stored in an externally located auxiliary storage means temporarily while the basic calculator is performing additional operations. It is a simple matter to bring forth the stored answer from the auxiliary storage means for use at a subsequent occasion. This particular feature is difficult in inexpensive mechanical desk calculators.

In performing arithmetical operations electronically it is necessary to provide storage of particular portions of information while performing computations on other segments of information. The conventional storage elements widely used in digital computing devices are well suited for this function. However, in designing the inexpensive desk calculator in which the arithmetical operations are performed electronically, the present invention recognizes the need for avoiding the use of relatively expensive and cumbersome storage devices.

In fully utilizing the abilities of a limited storage means and transistor techniques it is possible to construct an electronic calculator which contains substantially the same form factor as conventional mechanical calculators and in addition is comparable in price.

It is also possible, through electronics, to avoid duplication of parts. By merely directing signals into a few selected circuits it is possible to make these circuits perform for substantially every computation.

It is an object of the invention to provide a new and improved calculator which avoids one or more of the limitations and disadvantages of prior calculators.

It is another object of the invention to provide a calculator particularly suited for portable desk operation and capable of performing the arithmetic operations of addition, subtraction, multiplication, and division.

It is still another object of the invention to provide a calculator particularly suited for portable desk operation whereby the inputs and outputs are decimal numbers but all computing operations are performed in binary arithmetic.

It is still another object of the invention to provide a versatile calculator particularly suited for portable desk operation where the input and output information may be in the form of electrical signals enabling the calculator to be used with other related equipment.

It is a further object of the invention to provide a calculator particularly suited for portable desk operation It is still another object of the invention to provide a calculator particularly suited for portable desk operation and incorporating a simplified means for conditionally subtracting.

It is another object of the invention to provide a calculator particularly suited for portable desk operation and constructed with a minimum of mechanical parts.

In accordance with the invention, a calculator for performing arithmetic computations comprises insertion means for inserting information corresponding to a number to be utilized in a calculation and means for storing information representing all numbers which may be so utilized in a plurality of registers arranged serially along a path. The calculator further includes a reproducing element capable of traversing said path and responsive to the insertion means for successively reproducing and transferring to the following dynamic storage means during each traversal of a register any information stored in the register corresponding to the information so inserted. The calculator also includes dynamic storage means responsive to the so transferred information for developing and storing an answer including means for reproducing and again storing the answer with each traversal of a new register. The dynamic storage means also includes means for erasing the answer after each such reproduction. Finally, the calculator includes means for causing said reproducing element to traverse said path for conditionally subtracting the numbers in the plurality of registers from the so stored answer until the answer is reduced to zero and a recording mechanism responsive to the conditional subtraction for printing each digit of the answer at the time the digit is determined by the conditional subtraction.

In accordance with the invention, a calculator for performing arithmetic computations comprises an insertion means for inserting information corresponding to numbers to be utilized in a calculation and means for storing information representing all numbers which may be so utilized in a plurality of registers arranged serially along a path. Further included is a reproducing element capable of traversing said path and responsive to the insertion means for successively reproducing and transferring to the following dynamic storage means during each traversal of a register any information stored in the register corresponding to the information so inserted. Finally included is dynamic storage means for storing the so transferred information as an accumulation as each register is so traversed including means for reproducing the accumulation with each traversal of a new register and adding the reproduced accumulation to the information transferred from the new register and recording the sum as a new accumulation. The dynamic storage means also includes means for erasing the accumulation after each such reproduction.

Also in accordance with the invention, in a calculating machine, a system for conditional subtraction comprises supply means for supplying time-spaced subtrahend signals, first storage means for storing and reproducing a minuend signal, and second storage means for storing said minuend signal. The system for conditional subtraction also includes means responsive to the supply and first storage means for subtracting the subtrahend signal from the minuend signal and means responsive to the difference developed for alternatively selecting as the next succeeding minuend the said difference when the minuend exceeds the subtrahend or the minuend stored in the second storage means when the subtrahend exceeds the minuend.

Still further in accordance with the invention, in a calculator, a recording binary-to-decimal conversion system comprises circuit means for conditionally subtracting a binary number representing a decimal number and a recording mechanism for printing each digit of the decimal number at the time the digit is determined by integration of its corresponding binary information in the conditional subtraction.

For a better understanding of the present invention, together with other and further objects thereof, reference is had to the following description taken in connection with the accompanying drawings, and its scope will be pointed out in the appended claims.

Referring to the drawings:

FIG. 2 is a circuit diagram, partly schematic, of a second portion of the representative embodiment of the invention including computing circuit elements;

FIG. 6b shows curves useful in explaining the operation of the reversing circuit of FIG. 6a.

Figure 1:
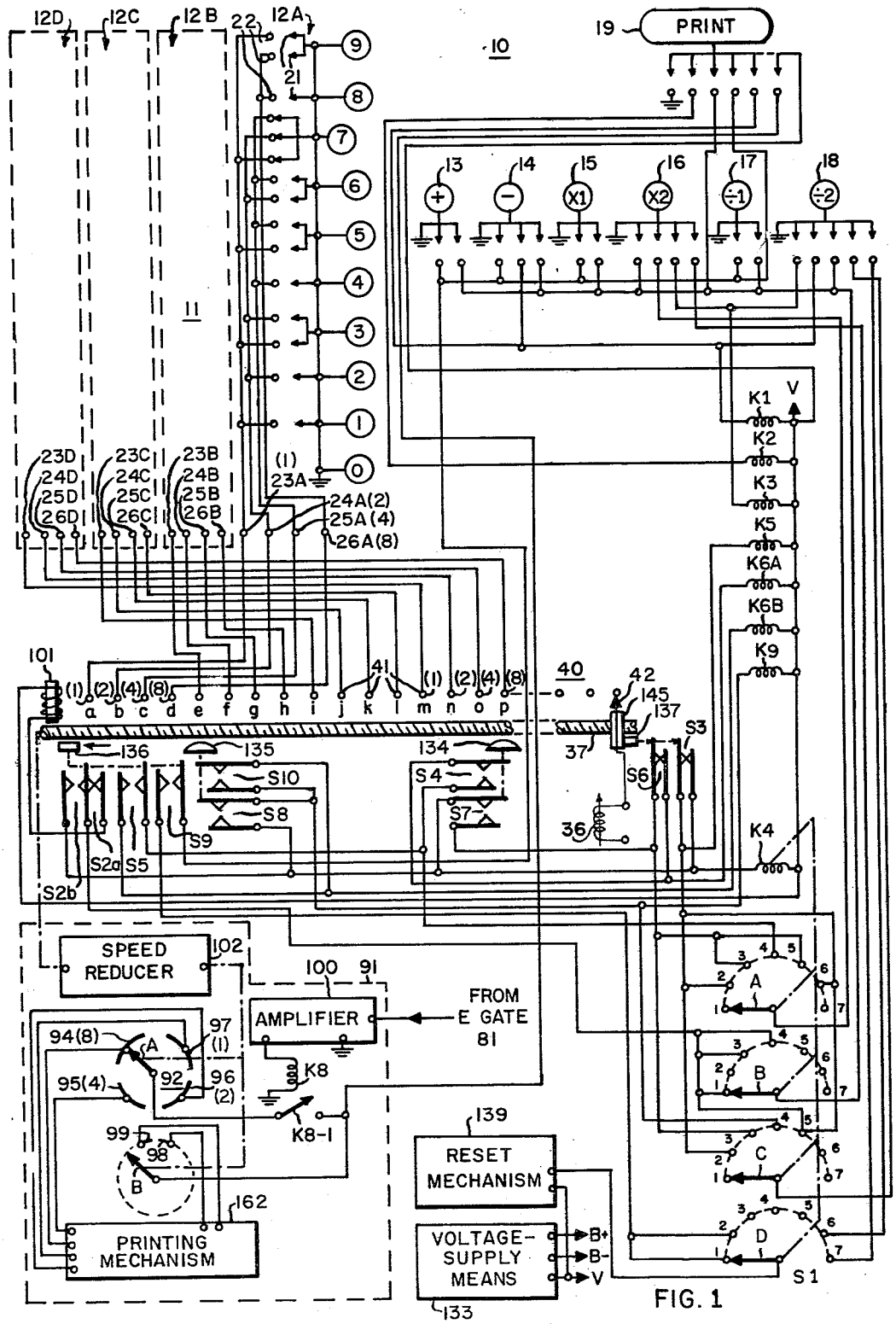
FIG. 1 is a circuit diagram, partly schematic, of a portion of a representative embodiment of the invention including switching elements.

Description of FIGS. 1 and 2 Calculating Machine

Referring now to FIG. 1, there is represented a circuit diagram, partly schematic, of a calculator 10 embodying the principles of the present invention in a particular form. The calculator 10 includes an insertion means, such as a keyboard 11, for successively inserting information corresponding to successive numbers to be utilized in a calculation. The keyboard 11 includes a plurality of ten-key units 12, further identified as 12A, 12B, 12C, and 12D, and control keys 13–19, inclusive, for selecting a particular calculator operation. Each of the ten-key units 12 includes ten numerical keys numbered from 0 to 9 and, in the present invention, a ten-key unit 12 represents a power of 10. In FIG. 1, ten-key unit 12A denotes $10^0$ or 1 and 12D denotes $10^3$ or 1000. The numerical keys thereon are simply a digit multiplier, 0–9, of that particular order of 10. For example, the number 2 key on ten-key unit 12D denotes the number 2000. While in FIG. 1 there are represented four ten-key units 12, indicating a machine capability of four decimal digits, it is clear that additional ten-key units 12 may be added, in accordance with this invention, to increase the capabilities of the machine. In the control section of keyboard 11 there exist seven control keys. Keys 13 and 14 are used in the adding and subtracting operations, respectively. Key 15 and key 16 are used for the multiplication operation and key 17 and key 18 are used in the division operation. The print key 19, as its name implies, is used when it is desired to extract the answer from the machine and display it in a printed form. The purpose of the control keys is to program or interconnect the circuitry in calculator 10 to perform an arithmetical operation. The positions of the numerical keys in their respective ten-key units 12 are representative of the number which is to be inserted into the machine and upon which a mathematical operation will be performed.

In the FIG. 1 embodiment of the invention, it is proposed by means of ten-key units 12 to select a number from 0–9 by combining the numbers 1, 2, 4, and 8. The numbers 1, 2, 4, and 8, or multiples of ten thereof, appear throughout this discussion, in FIG. 1 and elsewhere, as a consequence of the proposal just mentioned. In numerous cases, contacts on various switching means are significant from the standpoint that they are associated in some manner with one of the numbers 1, 2, 4, and 8. For clarity, the elements are identified with the appropriate number in parentheses. These are not to be confused with reference symbols. Accordingly, four output terminals 23, 24, 25, and 26, representing as indicated in FIG. 1 numbers 1, 2, 4, and 8, respectively are provided for each ten-key unit 12. The output terminals are coupled to the numerical keys through switch contacts 21 and 22. Switch contacts 21 are movable contacts mechanically coupled to the numerical keys. Selected switch contacts 21 are brought into contact with selected switch contacts 22 when a numerical key is depressed. Switch contacts 21 are electrically connected together and coupled to ground reference point.

It is apparent from FIG. 1 that the electrical interconnections of contacts 22 are designed to ground, either singly or in combination, terminals 23–26, inclusive, whose assigned numerical values total the value of the numerical key depressed. The conversion system just described is known as decimal-to-binary conversion. Referring to ten-key unit 12A where the number 7 key is shown depressed, it is seen that terminals 23, 24, and 25 corresponding to assigned values 1, 2, and 4, respectively, are thereby connected to a common ground. It will be shown in detail hereafter how the decimal calculator 10 makes use of this information in converting the depressed seventh key into binary signals representative of the number 7. The insertion means also includes commutating means 40 coupling the insertion means comprising the ten-key units 12 to the signal-reproducing means comprising reproducing element 36 for selecting the permanently stored signals to be reproduced. Commutating means 40 includes a plurality of fixed contacts 41 further identified in FIG. 1 as 41a–41p, inclusive. Reading from left to right, each contact of fixed contacts 41 is further identified by the assigned numbers (1), (2), (4), and (8) and each of contacts 41 is coupled to a counterpart of output terminals 23, 24, 25, and 26 of ten-key units 12. The commutating means 40 also includes a movable contact 42 which may be translated across fixed contacts 41.

Figure 3A:
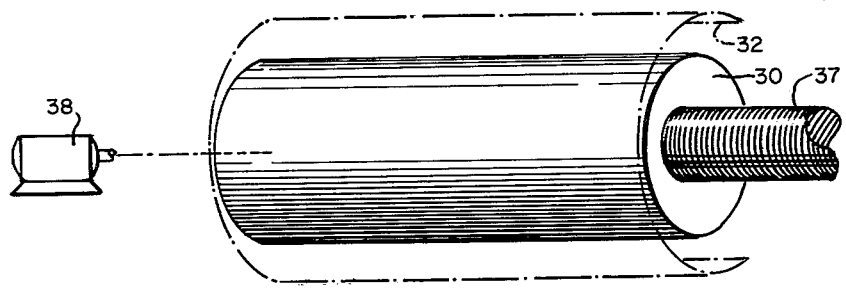
FIG. 3a is a general representation of a rotating drum storage means.
Figure 3B:
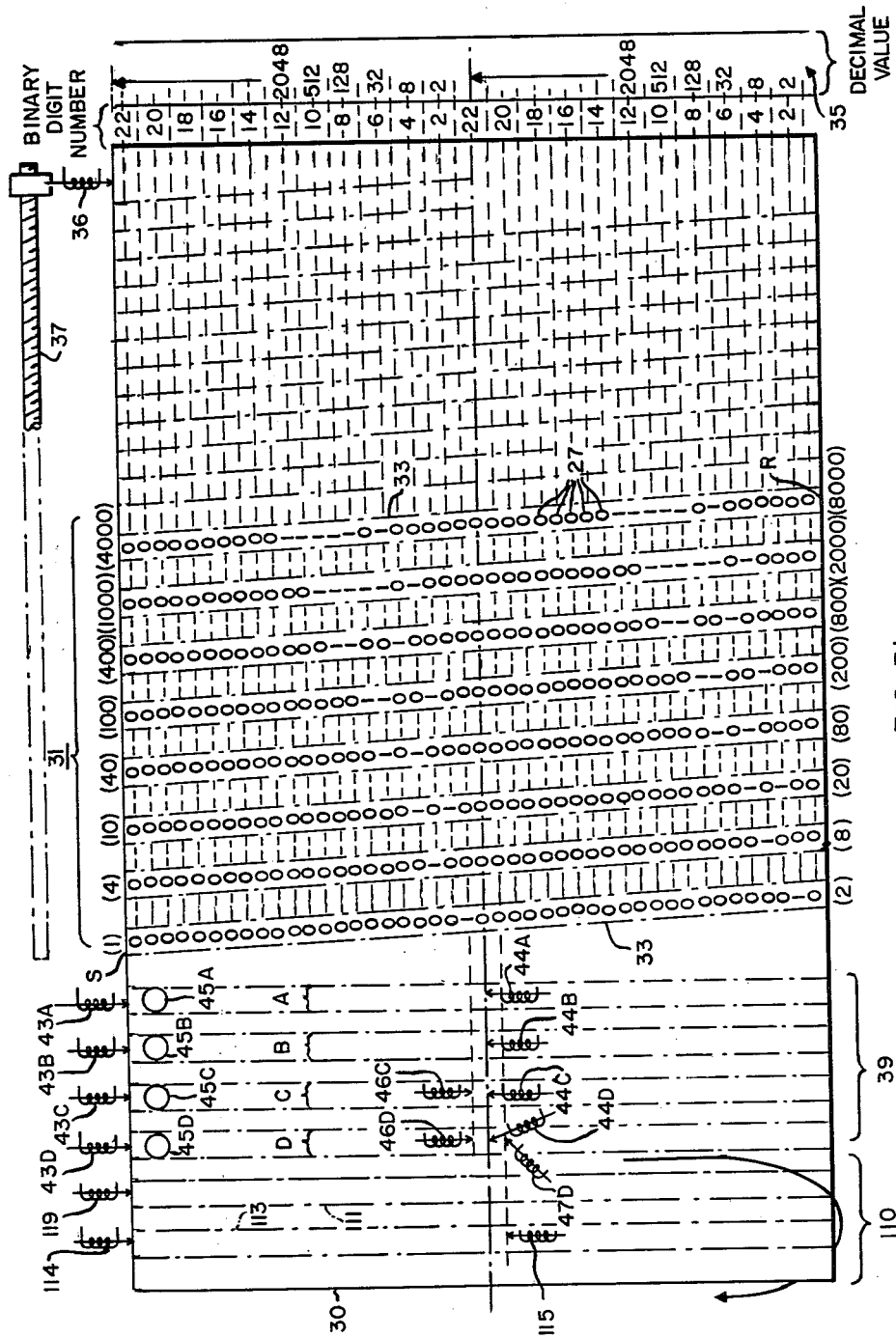
FIG. 3b is a detailed two-dimensional representation of the rotating drum storage means and elements associated therewith.

The calculator also includes a storage means 31 on rotatable drum 30 having information representing all numbers which may be utilized stored in a helical path running circumferentially around the drum. For a detailed discussion concerning the storage means 31 reference is made to FIGS. 3a and 3b of the drawings. FIG. 3a depicts a cylindrical drum 30 constructed of a nonmagnetic material, brass for example, and capable of being rotated about its longitudinal axis by motor 38. The surface parallel to the longitudinal axis is coated with a coating 32 of magnetic material, iron oxide for example, having the ability to maintain adjacent areas in the coating 32 in different magnetic states. FIG. 3b is a two-dimensional detailed representation of the surface of drum 30, the elements associated therewith, and the nature of the signals stored therein. FIG. 3b is constructed by assuming that the surface of drum 30 is severed as shown in FIG. 3a and flattened in the manner suggested by the figure. Within storage means 31 there is constructed a storage track 33 shown in dash-dot outline. Storage track 33 is constructed in the form of a continuous helix around the circumference of drum 30 with a finite width along its longitudinal axis. Storage track 33 commences at point R and ends at point S. Within track 33 there are permanently stored, in a prescribed sequence, groups of signals in the form of magnetized and demagnetized areas. Each group of signals is representative of a binary equivalent of a predetermined decimal number. Each group of signals subtends, for the purposes of this discussion, an angle of 180° or half of the drum 30 surface.

Storage track 33 is further divided into twenty-two storage areas 27 along each 180° of arc corresponding to each group of signals. In a conventional approach to magnetic storage techniques, a magnetized area in storage track 33 constitutes a "1" and is so indicated in FIG. 3b. An unmagnetized area constitutes a "0" and is so indicated in FIG. 3b. Each storage area 27 constitutes a digit in the binary system and the twenty-two storage areas 27 constitute twenty-two binary digits of a binary number. Thirteen binary digits of storage areas 27 are the minimum required under the assumed decimal capacity of calculator 10. However, twenty-two are best suited for this embodiment for purposes to be shown hereafter. It is understood that with increasing capacity an increased number of binary digits is required to represent higher order decimal numbers.

The groups of 1's and 0's shown on storage track 33 describe the magnetic state of a particular section of storage track 33 and, therefore, represent the binary number stored in that section of the track. Twenty-two binary digits constitute a single number or binary register. The value of each number so stored is indicated above and below the binary representation. From FIG. 3b it is seen that the numbers stored in storage track 33 are equal to the numbers 1, 2, 4, and 8 and multiples of ten times these numbers. The largest number is stored at the beginning of storage track 33 at point R and the smallest number at the end of storage track 33 in the vicinity of point S. Numerical series 35 is submitted to facilitate the understanding of the significance of the stored areas 27 in track 33. Each number in the numerical series 35 represents the decimal value of an adjacent row of storage areas 27. It is further evident from FIG. 3b that two binary numbers are made available in one revolution of drum 30. Accordingly, a single computer cycle will be performed in one-half of a revolution of drum 30.

As represented in FIG. 3b, the decimal calculator further includes a signal-reproducing means comprising the reproducing element 36 for reproducing and transferring the stored signals. Reproducing element 36 may be a conventional magnetic pickup head widely used in conjunction with magnetic storage apparatus including magnetic drums and magnetic tapes. Reproducing element 36 is mounted adjacent the surface of magnetic coating 32 and separated therefrom by a small air gap. In operation, a voltage is induced in reproducing element 36 each time a magnetized area 27 in storage track 33 passes beneath it. Associated with reproducing element 36 is a threaded member 37 for translating the reproducing element 36 parallel to the longitudinal axis of drum 30 across the total length of storage means 31. The translation rate of reproducing element 36 is adjusted to the helix angle of storage track 33 to place reproducing element 36 over storage track 33 at all times. The described relative motion of these elements gives rise to induced signals in reproducing element 36 in the order in which stored signals appear on storage track 33. A suggested means for performing this operation is to make the lead of the thread on threaded member 37 equal to the angle the helix storage track 33 makes with the longitudinal axis of rotating drum 30.

The movable contact 42 is mechanically synchronized to reproducing element 36 and is translated parallel to the longitudinal axis of rotating drum 30 for the full length of the storage means 31 with reproducing element 36. During the translation, movable contact 42 successively makes contact with each of the fixed contacts 41. The transition from one fixed contact to the next fixed contact is made during the period it takes the reproducing element 36 to travel from the last digit position in each register to the first digit position in the following register. Movable commutating contact 42 is electrically coupled to one terminal of reproducing element 36.

The calculating machine also includes a dynamic storage means for storing the transferred information of successive transfers as an accumulation at the end of each transfer. The accumulation is reproduced at the beginning of each transfer, combined therewith, and recorded as a new accumulation. The accumulation is erased after each reproduction. The dynamic storage means includes four adjacent circumferential areas A–D, inclusive, on the surface of drum 30. Each circumferential area comprises a dynamic storage track. Each track has associated with it a reproducing element 43, a recording element 44, and an erasing magnet 45, all further identified as to track by letters A, B, C, and D. Referring again to FIG. 3b, there is represented to the left of permanent storage means 31 the four storage tracks designated A, B, C, and D. It is further seen that each reproducing element 43 is located diametrically opposite a corresponding recording element 44. Erasing elements 45 are located on the magnetic track and positioned to erase every signal on the track immediately after the signal passes under the reproducing element 43. In this fashion, the dynamic storage means 39, comprising storage tracks A–D, inclusive, is incapable of retaining a signal for longer than one-half revolution of rotating drum 30, one arithmetic cycle. In order for a signal to be retained, it must be reproduced and immediately re-recorded. Also in FIG. 3b, there is represented, associated with storage tracks C and D, additional recording elements 46C, 46D, and 47D. Recording elements 46C and 46D are offset on the surface of rotating drum 30 by one storage area ahead of recording elements 44C and 44D. Recording element 47D is offset one storage area behind recording element 44D.

The calculating machine still further includes circuit means coupled to the signal-reproducing means, comprising reproducing element 36, and the dynamic storage means 39 for performing binary arithmetical operations and developing a binary answer. Referring to FIG. 2 of the drawings and without considering any particular order or element previously described, the circuit means numbers among its elements adding circuits 50, 74, and 104, a plurality of gating circuits, reversing circuits 53 and 56, and gate generators 64 and 72. Each of the adding circuits 50, 74, and 104 includes two input terminals and a single output terminal. When signals representative of binary numbers, hereinafter referred to as binary numbers, are simultaneously coupled to the input terminals of the adding circuits 50, 74, and 104, a binary number is developed therein representing the sum of the binary numbers applied to the input terminals. The details of the construction of the adding circuits 50, 74, and 104 are well known in the art and do not require a detailed explanation. For the purposes of this invention, a serial adder is required. A block representation of a serial adder is represented in Fig. 4–31 on page 130 of Arithmetic Operations in Digital Computers, by R. K. Richards, published by Van Nostrand. A serial adder circuit is also shown in Fig. 13–7 on page 275 of the text High Speed Computing Devices, by Engineering Research Associates, McGraw-Hill Publishing Co.

The circuit means further includes a plurality of gating circuits. These gating circuits may be classed in three categories. The first class, of which C gate 49 is representative, functions as a conventional "and" gate whereby an output signal is developed only when signals of approximately the same duration are simultaneously applied to the input terminals of the gate. D and F gates are also included in this general category and the sole difference from that of the C gate lies in the source of the signals applied to their input terminals. E gate, representative of the second class, in an "inhibiting" gate passing signals applied to one input terminal but blocking the passage of any signal upon the simultaneous application of signals to the second input terminal. In the present application, the C, D, E, and F gates are enabled for approximately the duration of a single binary digit. The third class of gates which embraces A, B, and G gates is also of "and" gate type. These are enabled for a predetermined duration of time permitting the translation of any signal applied during the enabling period. The enabling period will vary with the nature of a particular mathematical operation. The enabling signals for the A and B gates are derived from gate generator 64. Gate generator 64 is a conventional flip-flop having two conditions of stability. Successive application of signals to either input terminal 67 or 65 will not initiate a change in stability. The condition of stability will alternate as signals are applied to alternate input terminals. A signal applied to terminal 67 enables the A gate while a signal applied to terminal 65 enables the B gate. The second gate generator 72 responds to a single trigger signal to develop a pulse signal of predetermined duration. The output signal is applied to input terminal 71 of gate 70 for enabling G gate 70 for the period of the applied signal. The duration of this gate signal is equal to the time it takes for a single binary number to be reproduced by the reproducing element 43A. Accordingly, the gate duration is determined by the physical characteristic of drum 30. Clearly, the gate duration will vary with rotational speed and diameter of drum 30. A conventional monostable multivibrator circuit whose output signal duration is determined by the proportioning of its circuit parameters may be used to fulfill the requirements of gate generator 72.

The circuit means further includes reversing circuits 53 and 56. These circuits are identical in construction, operation, and function. A single input signal is reproduced at two output terminals in two forms, a directly translated signal and a reversed signal. The reversed signal is derived from the input signal but the positions of the 1's and 0's are reversed. Terminals 54 and 57 provide a directly translated signal of reversing circuits 53 and 56, respectively. Terminals 55 and 58 provide the reversed signals of reversing circuits 53 and 56, respectively. A suggested construction for the reversing circuits 53 and 56 is described in FIG. 6a of the drawings and discussed hereafter. A single input signal develops a pair of output signals one of which is a direct reproduction of the input signal and the other a reverse reproduction. In series with each reproducing element is inserted an amplifier of conventional design of which amplifier 83 is representative. The purpose of this amplifier is to amplify the reproduced signals to a level suitable for use by other circuits in calculator 10.

The calculator 10 still further includes an output means operable in synchronism with the signal-reproducing means and responsive to the binary answer for developing a decimal output representative of the answer. The output means 91, represented in FIG. 1 in dashed outline, includes a rotary switch 92 comprising two switch decks. Associated with each deck are rotating contacts A and B, respectively. The rotating contacts A and B better known as rotors are coupled to the drum 30 through a 2-to-1 speed reducer 102. Consequently, the rotors make one complete revolution for two revolutions of rotating drum 30. Switch 92 includes for contacts 94, 95, 96, and 97 disposed around the circumference of one deck and electrically insulated from each other. These contacts are further identified by the numerals (8), (4), (2), and (1). In the FIG. 1 representation, rotation contact A is shown in contact with switch contact 94. By means of the mechanical coupling arrangement, contact 42 on commutating means 40 will be in contact with a particular fixed contact 41 having a corresponding numeral (8), for example contact 41p. As the contact 42 is translated across fixed contacts 41, it touches successively contacts 41p, 41o, 41n, and 41m assigned, respectively, numbers (8), (4), (2), and (1). Rotor A in synchronism with this movement moves successively from contact 94 through 95 and 96 to 97 assigned, respectively, numbers (8), (4), (2), and (1). In this fashion, rotor A is aligned at all times with the position of contact 42. Printing mechanism 162 is coupled to switch 92 for printing decimal numerals in accordance with instructions received from the calculator 10 circuitry. Printing mechanism 162 may be of conventional construction as widely used in commercial teletype machines. For the use in calculator 10, printing mechanism 162 need contain only one print bar containing the numerals 0 to 9. Output means 91 further includes amplifier 100, relay K8, and its associated contact K8–1. Amplifier 100 is conventional in construction and is designed to energize relay K8 when a signal is applied to its input terminal. Relay K8, when energized, closes contact K8–1 applying power through rotor A and contacts 94–97, inclusive, to printing mechanism 162.

Printing mechanism 162 is a mechanical adding device. In the course of a print cycle, printing mechanism 162 may receive power sequentially through contacts 94–97, inclusive, on switch 92. Printing mechanism 162 in a conventional operation takes note of the contacts through which power is received and prepares to print a numeral whose magnitude equals the sum of the assigned values of these contacts. In the course of an operation the sum may never exceed 9. A signal to print the prepared numeral is coupled from rotor B of switch 92 when rotor B is in contact with contact 98. The print signal is followed by a reset signal which resets printing mechanism 162 to its inactive position. The reset signal is coupled to printing mechanism 162 when rotor B of switch 92 touches contact 99. Both the print and reset actions occur during the interval that the rotor A of switch 92 travels from contact 97 to contact 94. A revolution of rotors A and B represents a print cycle.

In FIG. 1 the primary synchronization is accomplished by means of the single drum system. In view of the fact that all storage facilities are constructed on the surface of a single drum and that the only relative movement with respect to the storage system is the rotation of the drum, the signals employed throughout the calculating system must at all times be in synchronism. For example, signals recorded simultaneously in each of the tracks in dynamic storage means 39 are of necessity translated in synchronism through a 180° rotation of drum 30 and must of necessity appear beneath their respective reproducing elements 43. It is recalled that recording elements 44 and reproducing elements 43 are situated diametrically opposite each other. The above illustration emphasizes that there need not be any critical alignment between respective elements on adjacent recording tracks provided recording elements 44 and reproducing elements 43 are diametrically opposite one another. Recalling also that the source of all binary signals is in storage track 33, synchronism between it and the dynamic storage means 39 is also controlled by the single drum 30. While a single drum is preferable for the reasons just discussed, this invention may be practiced with a plurality of drums provided they are closely synchronized. Moreover, those skilled in the art will be able to devise equivalents of the drum geometry, for example, arrangements where the equivalent results are obtained on disc-shaped structures or endless belts.

The calculator 10 further includes a second synchronizing means 110 represented in FIG. 2 for assuring the proper orientation of signals throughout the calculator system. The second system for synchronizing the calculator mechanism consists of two permanent storage tracks identified as a clock track 111 and synchronization track 113. Each of the storage areas in clock track 111 has been magnetized to develop a binary signal comprising twenty-two 1's. The first clock signal is in synchronism with the first binary digit and the last clock pulse is in synchronism with the last binary digit of each number stored in storage track 33. Reproducing element 119 associated with the clock track 111 reproduces a series of periodic signals, each cycle of operation starting at a time corresponding to the appearance of the first binary digit in the system and spaced in accordance with the spacing of the binary digits of a binary number. In the synchronization track 113 only the first storage area in each half of drum 30 has been magnetized. Consequently, reproducing element 114 aligned with reproducing element 36 over the same radial plane will reproduce the stored signal in synchronism with the first binary digit. Reproducing element 115 is displaced twenty-two storage areas from reproducing element 114, thereby reproducing the stored signal in synchronism with the last binary digit.

In FIG. 1 there is also represented a plurality of electromechanical relays. These relays are of conventional design and construction and need not be discussed in great detail. Their function is to interconnect the various elements of the calculator 10 in conformance with the program established by the front panel control keys 13–19, inclusive. For simplicity of explanation relays are described but in the alternative electronic switching may replace the relays in the signal path. Relay coils are identified by a K number and contacts associated with a relay are identified with the same K number. All relay contacts are shown in a de-energized condition. Also of interest is voltage-supply means 133 which, in a conventional manner, converts the input power voltage to calculator 10 to voltages suitable for operating the various circuits and relays employed therein. Voltage V is used as power for the various switching circuits employed and B+ and B− designate the voltage required by the electronic circuitry employed. Reset mechanism 139 in FIG. 1 resets the numerical and operational keys on keyboard 11 at the conclusion of each step in the calculation when the input circuit to reset mechanism 139 is grounded.

Further included in the FIG. 1 representation are switches S1–S10, inclusive, and solenoid 101. Switch S1 is a rotary stepping switch embodying for switch decks, each containing fixed contacts and a rotor. Switch S1 also includes a coil K4. Each time coil K4 is energized, the rotors are displaced one contact in a clockwise direction in a typical stepping action. Switches S2–S10, inclusive, are mechanically activated switches. The function of these switches will be described in the section pertaining to the operation of the representative embodiment.

The FIG. 1 embodiment also contains plungers 134, 135, 136, and 137. A common feature of these plungers is that they are mechanically coupled to one or more of switches S2–S10, inclusive. Switches S3 and S6 are coupled to plunger 137 and activated thereby. Switches S2, S5, and S9 are coupled to plunger 136 in a similar manner. Plungers 136 and 137 in FIG. 1 mark the terminal points of the translation of reproducing element 36. The distance between the plungers 136 and 137 is determined by the decimal digit capacity of calculator 10. In the present invention it is seen that the lateral movement of reproducing element 36 is synchronized to the rotational speed of drum 30. It is, therefore, possible to count hte number of revolutions by measuring the lateral distance along the line of travel of reproducing element 36. Plungers 136 and 137 are adjusted to a distance corresponding to thirty-three registers in the helix storage track 33 on drum 30. This corresponds to eleven half revolutions of drum 30 prior to the time that reproducing element 36 starts to reproduce signals; the sixteen half revolutions corresponding to the sixteen binary numbers stored on drum 30 in storage track 33, and six half revolutions after the last binary number stored. The significance of these features will become apparent hereafter.

In a similar fashion, the distance between plunger 134, coupled to switches S4 and S7, and plunger 135, coupled to switches S8 and S10, is adjusted to twelve half revolutions of drum 30. Plunger 134 rests at the start of the helix storage track 33.

Solenoid 101 is employed in a particular form of clutch for coupling and uncoupling reproducing element 36 to threaded member 37.

Figure 4:
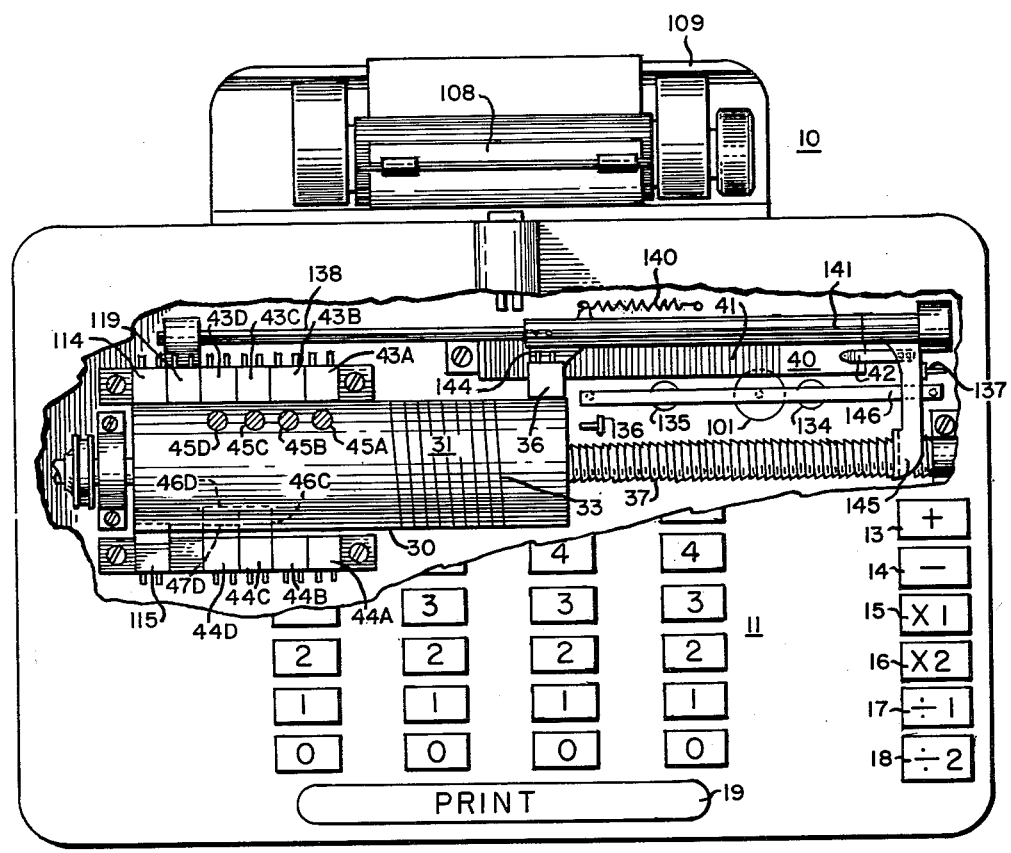
FIG. 4 is a mechanical representation of the representative embodiment.

Description of FIG. 4 Calculator

In FIG. 4 there is represented an embodiment largely mechanical in nature of calculator 10. Many of the elements heretofore described have been identified by the same numerical designations and will not be further discussed. However, the FIG. 4 representation illustrates a means for constructing the calculator 10 and, in particular, the translation means for reproducing element 36. Reproducing element 36 is coupled to threaded member 37 through a hollow cylinder 141 and arm 145. The required synchronism between the movement of reproducing element 36 and contact 42 of commutating means 40 is obtained by fastening contact 42 to arm 145.

Arm 145 rests, while inactive, on a bar 146. Bar 146 is attached to solenoid 101 and is lowered when solenoid 101 is energized. In its raised position, bar 146 prevents arm 145 from contacting the threads of threaded member 37. Thereby, arm 145 remains fixed in position.

Rod 138 is inserted within the aperture of cylinder 141 and guides the movement of the several parts attached thereto parallel to the longitudinal axis of drum 30. Spring 140 returns cylinder 141 and the elements attached thereto to their initial inactive positions. In FIG. 4, the reproducing element is in its inactive position to the right of storage track 33. Arm 145 rests against plunger 137.

Paper 108 and carriage 109 are also represented in FIG. 4. It was previously seen that only one type holder is needed with calculator 10. A multidigit answer is printed on paper 108 by shifting carriage 109 after each character is printed. The action is not unlike a standard electric typewriter or teletype machine.

Operation of FIGS. 1 and 2 Calculator

In order to minimize the number of movable parts required to construct an efficient desk calculator suitable for portable and desk operation, the arithmetical operations are performed in binary arithmetic. The simplicity of the binary system has made it possible to design a relatively simple storage mechanism which, is capable of performing the several arithmetical computations. Since our modern-day system is designed around the decimal system, it is first necessary in operating the calculator 10 to convert from the decimal to the binary systems. The end result of the computation within the machine is an answer in binary form. Consequently, in order for this information to be of use commercially, it is necessary to convert the binary answer to a decimal form more familiar to the public at large. For clarity and simplicity, the operation of the representative embodiment will be discussed first in a very general fashion. Thereafter, the several arithmetical operations will be discussed separately in detail.

In order to put the machine into operation, the operator depresses the appropriate numerical keys on keyboard 11. A control key is then depressed. A first function of the control key is to select a signal route and circuit elements to perform a particular computer operation. The depression of the control key also starts the movement of reproducing means 36 across the surface of drum 30. During this travel, the decimal number inserted in the keyboard is converted to its binary equivalent, in a way to be described hereafter, and the equivalent is transferred to or inserted in dynamic storage means 39. The binary number is retained in the dynamic storage means 39 until it is required to be used for continuing the computation. The second step, in addition for example, is to insert a second number to be added to the first. In this regard, the operator merely depresses the appropriate numerical keys on the keyboard 11 and once again depresses a control key, control key 13 for addition. Once again the decimal number represented by the numerical key depressed on keyboard 11 is converted into its binary equivalent by the action of reproducing means 36 in its movement across the surface of drum 30. The second inserted number and the first number, temporarily stored in the dynamic storage means 39, are simultaneously coupled to an adding circuit where the binary signal representing the sum of the two numbers is developed and recorded in the dynamic storage means 39. The above-described process is repeated for as many additions as are required and an answer is thereby produced. Binary addition is the basic function used throughout calculator 10 in all phases of its operations. Of particular significance to this invention is the operation of the dynamic storage means 39 comprising storage tracks A, B, C, and D. As heretofore described, erasing magnet 45 erases the number information stored within the storage track immediately after it is reproduced. Recalling that the dynamic storage means 39 is located on the continuously rotating drum 30, it is apparent that unless the number stored within the dynamic storage means 39 is immediately recorded within the dynamic storage means 39 or translated and utilized in a calculation, the number is lost for future use. This feature has made it possible to reduce the size of storage means normally required in calculators to a minimum. At any time the binary number in dynamic storage means 39 is of interest in the problem, intermediate storage of past used information is eliminated. To return to the typical operation previously discussed, the answer which is now stored in the dynamic storage means 39 is retained in the dynamic storage means 39 by re-recording the signal information in each cycle of operation of the machine. The binary number is extracted from the dynamic storage means and converted to its decimal equivalent by means of a process called "conditional subtraction." The purpose of the conditional subtraction operation is to convert the binary signal information into signal information which can be translated to the output means 91 for recording on paper 108 as a decimal number.

*Operation of Calculator in Performing Addition*

Figure 5:
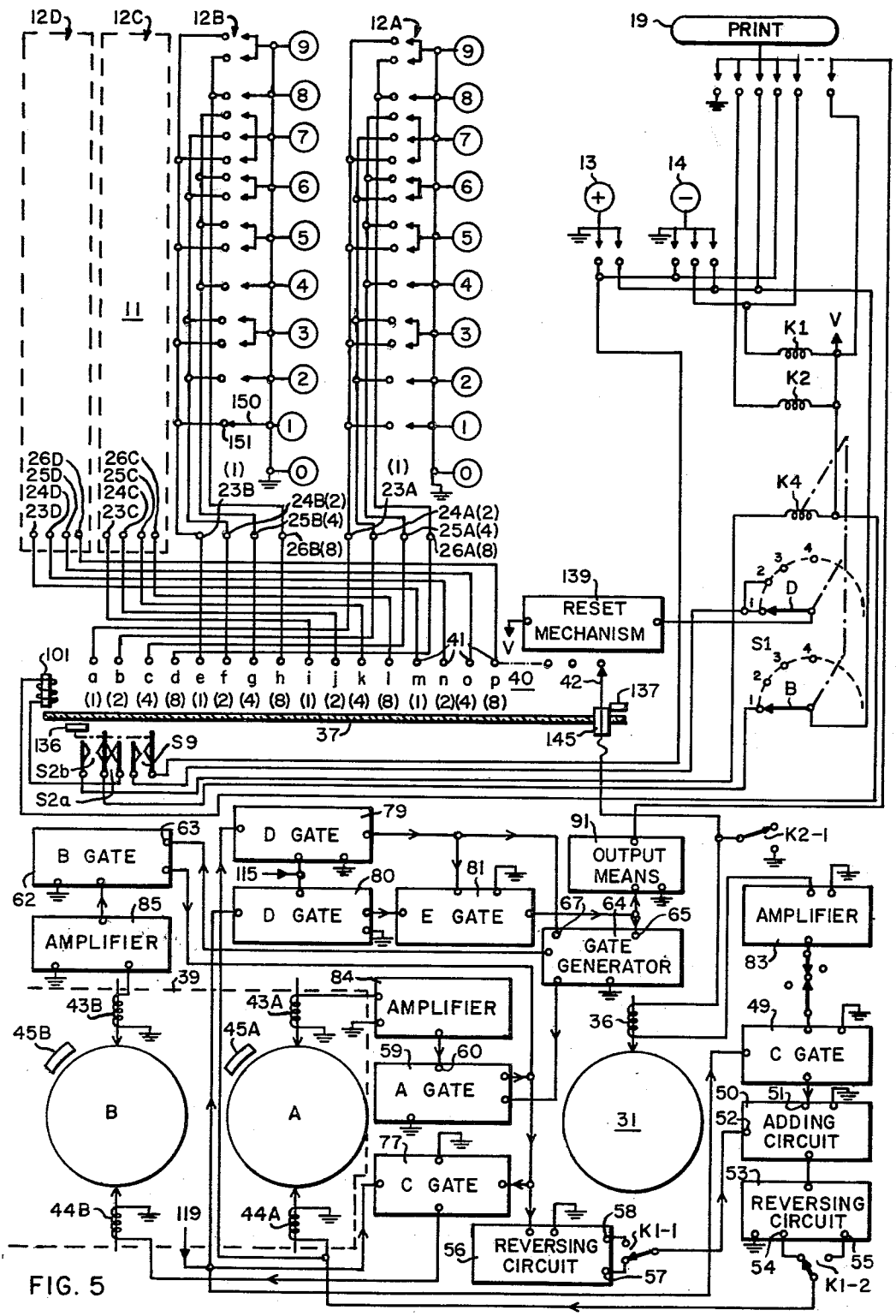
FIG. 5 is a circuit diagram comprising a segment of FIGS. 1 and 2 useful in explaining the operation of the invention.

Referring now to FIG. 5 of the drawings, there is represented the portion of the FIGS. 1 and 2 embodiment used in performing an operation in addition. The elements in FIG. 5 have been extracted in order to simplify the discussion of the operation of the calculator 10. For the purpose of this discussion, it is assumed that the decimal numbers 10, 7, and 6 are to be added and the total 23 extracted from calculator 10. The FIG. 5 drawing represents the condition of the calculator 10 immediately after the operator has inserted the number 10 in the keyboard 11 by depressing the number 1 key in ten-key unit 12B. Reproducing element 36 is in its inactive position at the extreme right of threaded member 37. It is assumed that solenoid 101 is de-energized thereby disengaging arm 145 from threaded member 37. Voltage V is applied directly to one terminal of relay K4 and solenoid 101. Relay K4 and solenoid 101 are not energized because the circuit path to ground is broken. The remaining relays shown in FIG. 5 remain passive throughout the addition operation. By depressing the number 1 key in ten-key unit 12B, movable contact 150 is brought in contact with fixed contact 151. This action completes the connection from contact 41e of commutating means 40 through ten-key unit 12B to ground. Having inserted the decimal number 10 in keyboard 11 the next step is to convert the decimal number 10 to its binary equivalent and store the binary equivalent in the dynamic storage means 39. This operation is performed by depressing the addition key 13 thereby energizing solenoid 101 through rotor B and switch S2a causing arm 145 to engage the threads of threaded member 37. Immediately after the engagement takes place, arm 145 starts to travel to the left along threaded member 37. As a consequence of being mechanically coupled to arm 145, reproducing element 36 and contact 42 also are translated parallel to the surface of drum 30. After an initial pretravel, contact 42 successively makes contact with each of the fixed commutating contacts 41 with each 180° rotation of drum 30. Similarly, reproducing element 36, after the pretravel distance, is placed in a position to reproduce the largest binary signal in the storage track 33. The first of contacts 41 which is contacted by contact 42 is contact 41p. At this time reproducing element 36 is magnetically coupled to the stored signals in storage track 33 representing the number 8000. However, since contact 41p when traced through terminal 26D to ten-key unit 12D is not grounded, the induced signals in reproducing element 36 cannot be translated. The next contact touched by contact 42 in the movement of arm 145 down the length of threaded member 37 is 41o. The circuit path for the induced signals in reproducing element 36 is similarly incomplete and as a result the induced signals cannot be translated. The same condition exists with respect to the other contacts in the reverse order of 41n through 41f. At a given time during the translation period of arm 145 and the elements attached thereto, contact 42 contacts fixed commutating contact 41e. At this time the reproducing element 36 commences to receive induced signals representing the number 10 stored in the storage track 33. Fixed terminal 41e is grounded through the contacts associated with the depressed key 1 in ten-key unit 12B. As a consequence of this grounding action the induced signals in reproducing element 36, representing the binary equivalent of the decimal number 10, are coupled to the input terminal of amplifier 83 where the signals are amplified and translated to C gate 49. Simultaneously with the appearance of the binary number 10, a clock pulse derived from reproducing element 119 on clock track 111 appears at the second input to C gate 49. The purpose of the clock signal is to enable the C gate 49 during the occurrence of the clock pulse thereby providing positive synchronization between the signals passed by C gate 49 to adding circuit 50 and the remainder of the system. While it is possible to orient reproducing means 36 over the storage track 33, it is virtually impossible within practical mechanical means to assure that the reproducing means 36 will reproduce stored signals at exactly the same time during each translation. In the FIG. 2 embodiment it is seen that a C gate exists in the signal path of all storage tracks. Clock pulses are applied simultaneously at each C gate thereby permitting signal translation in signal paths only during the existence of the clock pulse. Any portion of the reproduced signal from reproducing element 36 occurring before the clock pulses will not be translated by the C gate 49 by the very nature of its function. Similarly, any portion of the reproduced signal from reproducing element 36 occurring after the clock pulses will not be translated through C gate 49 since C gate 49 requires the simultaneous application of signals to both its inputs in order to develop an output signal. The signal applied to input terminal 51 of adding circuit 50 is, therefore, a faithful reproduction of the signal representing the number 10 induced in reproducing element 36. Since the number 10 was the first number inserted in the machine, there is no signal present at input terminal 52 of adding circuit 50. Consequently, the sum of the two input signals is again a reproduction of the binary number 10. The reversing circuit 53 receives the signal from adding circuit 50 and translates it with the same polarity through terminal 54 and relay contact K1–2 to recording element 44A and an input terminal to D gate 79. The action of D gate 79 is of no consequence in addition and will be disregarded temporarily. The result of the abovedescribed operation has been the transformation of the decimal number 10 into its binary equivalent and the binary equivalent has been stored in storage track A of dynamic storage means 39. Of special note is that the entire action has been accomplished through the medium of electronic circuitry and, therefore, the storing process in track A occurs substantially instantaneously with the reproducing process of reproducing element 36. Also since storage track A and storage track 33 are constructed on the same drum, there is perfect synchronism between the first and subsequent storage areas in storage track A and the first and subsequent storage areas of any number in the storage track 33. A novel feature of the single drum employed is that the fixed position of reproducing element 36 with relation to the fixed position on the circumference of drum 30 of the recording and reproducing elements in the remaining storage facilities is not critical. A number translated by reproducing element 36 is instantaneously stored in the dynamic storage means 39 and appears under a reproducing element 43 in perfect synchronism with the appearance of the next binary number in storage track 33 under reproducing element 36.

On the next half revolution of drum 30, contact 42 is on contact 41d and binary number 8 in storage track 33 is in position to be reproduced and translated. The translation does not take place since the signal path through terminal 41d to ten-key unit 12A is not complete. The movement across storage means 31 by reproducing element 36 continues with the same effect and terminates when arm 145 contacts plunger 136. Plunger 136 opens switch S2a de-energizing solenoid 101 and closes switch S2b energizing relay K4 thereby causing the rotors of switch S1 to step to position 2. The purpose of this latter action will be explained in connection with the operation of the calculating machine in multiplication and division. Plunger 136 also closes switch S9 thereby completing the circuit from reset mechanism 139 through rotor D to ground in key 13. All keys on keyboard 11 are reset. Arm 145, reproducing element 36, and contact 42 are returned to the initial inactive position in contact with plunger 137 where they remain.

We have now completed the insertion of the decimal number 10 into the calculator 10. The binary number 10 is retained in storage track A awaiting the arrival of the number to be added to it. This retention in view of the permanent erasing feature heretofore discussed is accomplished by reproducing the number in reproducing head 43A and coupling the reproduced number through amplifier 84 to A gate 59 to reversing circuit 56. Reversing circuit 56 reproduces at terminal 57 a direct reproduction of the signal applied to its input terminal. Adding circuit 50 thereupon receives the signal from reversing circuit 56 and proceeds to develop a sum signal with the signal applied at terminal 51. At the instant when the stored binary number 10 is applied to terminal 52 of adding circuit 50 there is no signal applied to terminal 51 of adding circuit 50. Consequently, the adding circuit translates the number 10 unaltered through reversing circuit 53 to recording element 44A. The procedure just described occurs every calculator cycle, half revolution of drum 30, and the binary number 10 remains at all times stored within storage track A.

To insert the number 7 the operator merely depresses the number 7 key in ten-key unit 12A and then depresses the addition key 13 once again. The previously discussed operation is repeated except, during this second translation of arm 145, the binary equivalents of numbers 4, 2 and 1 in that order are reproduced individually. The first grounded fixed contact in commutating means 40 is 41c. At the time during the translation of arm 145 when contact 42 comes in contact with fixed contact 41c, reproducing element 36 is located in a position to reproduce the binary equivalent of the number 4. The binary number 4 is reproduced and translated through amplifier 83 and C gate 49 to terminal 51 of adding circuit 50. Simultaneously with the application of the binary number 4 to terminal 51 the binary number 10 stored in storage track A is translated to terminal 52 of adding circuit 50 from reproducing element 43A. The output signal derived as a result of these two applied signals is a binary signal representing the sum of 10 and 4 or 14. The binary number 14 is thereupon coupled to recording element 44A and stored in storage track A. As the arm 145 continues its translation, contact 42 attached thereto makes contact with fixed contact 41b. Reproducing element 36 is now in a position to reproduce the binary number 2 and the stored number 14 has traveled through 180° of rotation and is in a position to be reproduced by reproducing element 43A. The reproduction of the binary number 2 by reproducing element 36 from the storage track 33 occurs simultaneously with the reproduction of the number 14 stored in storage track A. The reproduced numbers 2 and 14 are applied to terminals 51 and 52, respectively, of adding circuit 50. The developed binary output signal from adding circuit 50 now equals the sum of 14 and 2 or 16. The binary number 16 is coupled through reversing circuit 53 and stored in storage track A by means of recording element 44A. As the drum traverses the next 180° of rotation, contact 42 is in contact with terminal 41a thereby grounding reproducing element 36. Reproducing element 36 is now positioned over storage track 33 to reproduce the binary number 1. At this same instant in time the binary number 16 in track A is in position under reproducing element 43A. The number 1 is reproduced and translated by reproducing element 36 at the same instant that the number 16 is being reproduced and translated by reproducing element 43A. Once again both of these signals are applied simultaneously to adding circuit 50 and the binary sum 17 is recorded in track A. We have now completed adding the number 10 to the number 7. Arm 145 thereafter continues its translation until it contacts plunger 136. All manual keys on keyboard 11 are reset and arm 145 returns to its inactive position.

Binary number 17 is retained in storage track A. The number 6 is added to 17 in the manner just described which requires a third translation of reproducing element 36. The new sum 23 in binary signal form is now stored within storage track A and maintained therein by repeated re-recording. Reproducing element 36 returns to its initial inactive position and all keys are reset. It is noteworthy that in an addition calculation a single translation of reproducing element 36 is required for each number to be added. The limiting factors regarding the speed of calculation are determined by the two principal moving elements, namely, storage drum 30 and arm 145 containing reproducing element 36.

*Operation of Calculator in Performing Subtraction*

The operations required to extract an answer from the dynamic storage means 39 to the printed sheet require the knowledge of how the calculator 10 performs the arithmetical operation of subtraction. For this reason, the subtraction process will be discussed prior to the discussion for extracting an answer. The arithmetical operation of subtraction is substantially identical to that of addition just described. Consequently, reference is again made to FIG. 5 representing the portion of the representative embodiment required in performing subtraction. It is a well-known mathematical principle that an arithmetical subtraction may be performed by adding the 9's complement of the minuend to the subtrahend. The 9's complement of the sum resulting from this addition is the desired difference. For example, if 2 is to be subtracted from 8, the subtraction may be performed by adding 1, the 9's complement of 8, and 2 and obtaining the sum 3. The 9's complement of the 3 equals 6 which is the answer to this problem in subtraction.

The calculator 10 performs arithmetical subtraction in an analogous manner with binary numbers. That is, calculator 10 uses the 1's complement system since in the binary system there exist only two digits 0 and 1, each digit being the 1's complement of the other. To obtain the 1's complement of a binary number it is merely necessary to substitute a 0 for a 1 and a 1 for a 0. This operation is performed in reversing circuits 56 and 53. The 1's complements of the input signal to the reversing circuits 56 and 53 are available from terminals 58 and 55, respectively. To obtain the 1's complement it is merely necessary to energize relay K1 thereby connecting terminals 58 and 55 in the signal path.

It is, for example, desired to subtract the number 7 from the number 10. In a manner heretofore described, the number 10 is inserted in keyboard 11 and translated to storage track A by depressing the appropriate numerical key and add key 13. The binary number 10 in storage track A represents the minuend. To subtract the number 7, the number 7 is inserted in keyboard 11 and subtraction key 14 is depressed. Subtraction key 14, in addition to coupling arm 145 to threaded member 37, also energizes relay K1 placing terminal 58 of reversing circuit 56 and terminal 55 of reversing circuit 53 in the signal path. The binary minuend 10 is maintained in storage track A by the repeated re-recording through adding circuit 50. The binary minuend 10 is coupled to adding circuit 50 through reversing circuit 56 wherein there is developed the 1's complement of the binary minuend 10. At the same instant that the 1's complement of binary minuend 10 is applied to terminal 52 of adding circuit 50, the binary number 4 reproduced by reproducing element 36 from storage track 33 is applied to terminal 51 of adding circuit 50. The resulting sum is coupled from adding circuit 50 to reversing circuit 53 where an output representative of the 1's complement of the arm is obtained from terminal 55 of reversing circuit 53. The 1's complement of the sum is further coupled to recording element 44A and recorded in storage track A. As was seen with regard to the numerical example given above, the 1's complement of the resulting sum is equal to the difference of the binary minuend 10 and the binary subtrahend 4. Consequently, the number stored in storage track A is the binary number 6 which now is maintained in storage track A as a new minuend. In the next arithmetical cycle, the binary number 2 is subtracted from binary minuend 6 to form a new minuend signal representing the binary number 4. On the succeeding cycle of operation, number 1 is subtracted from the stored minuend 4 to result in a new binary minuend 3 recorded and stored in storage track A. At the end of travel for reproducing element 36, reproducing element 36 is returned to its initial inactive position and the binary number 3 is maintained as the answer to the subtraction operation in storage track A.

*Operation of Calculator in Performing Conditional Subtraction*

To extract or print an answer that is stored within dynamic storage means 39, the calculator 10 employs an arithmetical operation commonly called conditional subtraction. Conditional subtraction is performed by the elements represented in FIG. 5 of the drawings and reference is made thereto.

Conditional subtraction is an arithmetical procedure of choosing a unique combination of selected numbers whose sum equals the number to be conditionally subtracted. In brief, conditional substraction is performed by a series of subtractions employing each of the selected numbers in decreasing order of magnitude as subtrahends. In the event the subtrahend exceeds the minuend in any particular operation, the operation is ignored. The minuend is retained and used in the next subtraction. If the subtrahend is smaller than the minuend, the difference is obtained and retained as the next minuend. The subtrahend used in developing the difference represents one number of the unique combination sought. The selection process just described continues until all of the select numbers have been utilized.

Generally, in performing conditional subtraction, the status of any one subtraction operation is not determined until the subtraction is completed. In practice, if the subtraction is improper, the subtrahend used therein is subsequently added to the difference developed thereby to regenerate the minuend. The next subtrahend is then brought forward and subtracted. The above procedure requires an intermediate addition for every improper subtraction.

In the present invention, the minuend is stored in a storage track during the course of a conditional subtraction to await the outcome of the subtraction. If the subtraction is proper, the stored minuend is disregarded and the difference developed in the conditional subtraction is employed as the next minuend. If the subtraction is improper, however, the stored minuend is brought forward immediately for the next conditional subtraction and the improper difference is rejected. The minuend need not be regenerated in an intermediate step. Since in most conditional subtraction applications the number of improper subtractions will exceed the proper subtractions, the entire operation is considerably accelerated by the elimination of the intermediate adding operation to restore the minuend.

By way of explaining the operation of calculator 10 in this regard, the number 23 will be conditionally subtracted by the numbers stored in storage track 33. The selected numbers exist in the form of binary numbers stored in storage track 33 in storage means 31. It may also be shown that there is a unique combination of the numbers stored in storage track 33 whose sum equals 23. For example, the numbers 20, 2, and 1 represent this unique combination. The means by which these three numbers are selected from the whole of the numbers stored in storage track 33 is called conditional subtraction. One of the means for initiating a conditional subtraction operation is to depress the print key 19. This act activates reproducing element 36 and energizes relays K1 and K2. Relay contact K2-1 couples reproducing element 36 to ground independently of the keyboard switches. Consequently, reproducing element 36 will reproduce and translate each number stored in storage track 33. Relay K1 when energized provides for a reversed output from reversing circuits 56 and 53. A fixed and movable contact pair on print key 19 is electrically isolated from ground. This contact pair is employed to supply power V to output means 91. The number 23 stored in track A is employed as the first minuend. Initially the calculator 10 attempts to subtract the highest number 8000 stored in storage track 33 from the minuend 23. The minuend is reproduced by reproducing element 43A and the 1's complement thereof is applied to adding circuit 50 simultaneously with the binary number 8000 from storage track 33. At this same time, a portion of the minuend 23 signal from the output of A gate 59 is coupled through C gate 77 to recording element 44B and recorded in storage track B. The signal representing the answer from the attempted subtraction of 8000 from 23 is coupled from adding circuit 50 to recording element 44A and is recorded in storage track A. Clearly, the attempted subtraction is improper. Therefore, the number stored in storage track A must be disregarded and the original minuend 23 brought forth for the next subtraction. Minuend 23 is no longer available in storage track A since the number resulting from the improper subtraction was substituted for it. Minuend 23, however, was stored in storage track B and it is brought forth for the next subtraction by enabling B gate 62. A gate 59 is disabled at this time preventing the further translation of the number coupled thereto from storage track A. Minuend 23 is reproduced by reproducing element 43B and coupled through amplifier 85 and B gate 62 to the input of reversing circuit 56 and also, through C gate 77, to recording element 44B. The latter re-records minuend 23 in storage track B so that it will be available should this second subtraction be improper.

The subtrahend for the next subtraction is the second highest number 4000 stored in storage track 33. Clearly, this subtraction is also improper and the machine takes note of this in a manner to be described, retaining number 23 stored in track B as the minuend. The improper subtractions between number 23 and each number stored in storage track 33 continue until a number of lesser magnitude than number 23 is reached. The first such number in storage track 33 is number 20. The subtraction of 20 from 23 takes place and the difference number 3 is stored in track A. The machine takes note of this successful subtraction and disables B gate 62 and enables A gate 59 in a manner to be described hereinafter. Consequently, number 3 stored in track A is translated to the adding circuit 50 as the minuend for the next subtraction. At the same time, number 3 is also recorded in storage track B by recording element 44B to await the outcome of the next subtraction. The next input subtrahend to adding circuit 50 is number 10 derived from storage track 33. An improper subtraction results and number 3 is brought forth from storage track B as the minuend for the subtraction with number 8 and thereafter with the numbers 4 and 2. The subtraction with number 2 is, of course, satisfactory and the difference number 1 becomes the new minuend and is subsequently successfully subtracted by number 1 from storage track 33.

Before discussing the means for switching A gate 59 and B gate 62, a binary arithmetical principle will be illustrated. A binary subtraction of 5 from 8 is illustrated in Equation 1 below:

$$\begin{aligned} \ldots\ldots 001000 \ (8) \\ \ldots\ldots 000101 \ (5) \\ \hline \ldots\ldots 000011 \ (3) \end{aligned} \quad (1)$$

On the other hand, if it is attempted to subtract 8 from 5, the result is shown in Equation 2:

$$\begin{aligned} \ldots\ldots 000101 \ (8) \\ \ldots\ldots 001000 \ (5) \\ \hline \ldots\ldots 111101 \end{aligned} \quad (2)$$

A comparison of Equations 1 and 2 illustrates the point to be made. The highest order binary digits in a proper subtraction, Equation 1, are 0's while those of an improper subtraction are 1's. The result is the same if subtraction is performed in the manner described for calculator 10 with 1's complements. It therefore follows that if the last digit of the signal derived from the output of reversing circuit 53 is monitored, the nature of the subtraction operation may be positively identified.

The gating circuit for switching between A gate 59 and B gate 62 further includes D gate 79, D gate 80, and E gate 81 in FIG. 5. One input terminal of D gate 79 and its counterpart in D gate 80 are connected together and coupled to reproducing element 115. Reproducing element 115 translates a signal in synchronism with the last binary digit of any binary number. The signal from reproducing element 115, hereinafter referred to as a last pulse signal, occurs once each cycle of operation. The second input signal to D gate 80 is a clock pulse. Consequently, an output signal is obtained from D gate 80 once each cycle of operation at a time corresponding to the appearance of the last binary digit in the remaining circuitry. The second input to D gate 79 is the difference signal derived from reversing circuit 53 and recorded in storage track A. In the event the last digit in the number from reversing circuit 53 is a 1, D gate 79 is enabled developing at its output terminal a signal which is coupled to a second input terminal of E gate 81 and terminal 67 of gate generator 64. Gate generator 64 thereby enables B gate 62 unless, of course, B gate 62 is already conductive. The output signal from D gate 79 is also coupled to E gate 81 where it acts to disable E gate 81. In the event the last digit in the number from reversing circuit 53 is 0, D gate 79 fails to generate an output pulse. E gate 81 is not disabled and the signal applied to it from D gate 80 is coupled to terminal 65 of gate generator 64. Gate generator 64 thereby enables A gate 59 unless, of course, A gate 59 is already enabled. Clearly, since this performance takes place during the interval allotted to the last binary digit, gate generator 64 receives, in the alternative, a signal from E gate 81 or a signal from D gate 79. Gate generator 64 has been described as a bistable flip-flop and, therefore, either, but not both, A gate 59 or B gate 62 is enabled in any one calculator cycle. Heretofore, at the start of any problem it has been assumed that A gate 59 was conductive. The assumption is now justified since B gate 62 is enabled only in conditional subtraction and then only when an improper subtraction has taken place.

In the conditional subtraction of number 23, only a single translation of reproducing element 36 across storage means 31 was required. At times corresponding to the reproduction of the numbers 20, 2, and 1 from storage track 33, an output signal was derived from E gate 81. This signal, in addition to enabling A gate 59, is used by output means 91 to print the number 23.

*Operation of Output Means 91*

The numbers 20, 2 and 1 whose sum equals the decimal number 23 to be printed have been selected by means of conditional subtraction. The numeral 2 in the decimal number 23 represents a digit multiplier of $10^1$ or 10. Correspondingly, the numeral 3 represents the digit multiplier of $10^0$ or 1. Accordingly, to convert the numbers 20, 2, and 1 to the decimal number 23, it is necessary to derive a proper digit multiplier of the particular powers of 10. Output means 91 performs this function and reference is made to FIG. 1 wherein output means 91 is represented. Rotors A and B of switch 92 rotate in synchronism with the movement of contact 42 of commutating means 40 in FIG. 1. Therefore, when rotor A is in contact with contact 94, with an assigned value of (8), contact 42 is also in contact with one of the contacts 41 having the same assigned numerical value, for example 41p. Rotors A and B of switch 92 are also synchronized with carriage 109. The carriage moves one digit position for each revolution of the rotors. The output means 91 is made operative by depressing print key 19. Relay power V is coupled from the insulated contact on key 19 to rotor B of switch 92 and to one terminal of relay contact K8–1. From the conditional subtraction operation a signal is obtained from the output of E gate 81 at the conclusion of each proper subtraction. This signal is coupled to amplifier 100 in output means 91. Amplifier 100 amplifies the signal from E gate 81 to the proper level for energizing relay K8 and relay contact K8–1 is closed thereby coupling relay power V to rotor A of switch 92.

The printing operation in conditional subtraction takes place simultaneously with the conditional subtraction to convert the binary answer to a printed decimal number. In converting the binary number 23, for example, the printing mechanism 162 will print a 0 in the 1000's and 100's decimal digit position. This is a direct result of the conditional subtraction operation as will be explained hereafter. The numeral 2 is printed in the 10's position as follows. As reproducing element 36 prepares to reproduce the number 20, rotor A is in contact with contact 96. Contact 42 is in contact with contact 41f and the carriage 109 is positioned in the 10's position. In the conditional subtraction phase of the print operation, a proper subtraction is registered and, consequently, a signal is developed at the output of E gate 81 in the manner previously described. A segment of this output signal is coupled to amplifier 100. Amplifier 100 amplifies the signal and energizes relay K8. Relay contact K8-1 closes and applies relay power V to printing mechanism 162 through contact 96 and rotor A of switch 92. Printing mechanism 162 is now in a position to print the numeral 2. However, prior to the actual printing action, rotor A contacts contact 97 in the conditional subtraction. At this time an attempt is being made to subtract 10 from 3. This, of course, is not a proper subtraction and, consequently, no signal is received from E gate 81 to energize relay K8. Rotor A thereby passes out of contact with contact 97 without further information being translated to printing mechanism 162. During the interval in which rotor A passes from contact 97 to contact 94, rotor B first touches contact 98. Relay power V is coupled thereby to printing mechanism 162 and the numeral 2 is printed. The printing mechanism is reset to its initial position when rotor B subsequently touches contact 99. The next printing cycle commences when rotor A touches contact 94. At this time in conditional subtraction, an attempt is being made to subtract 8 from 3. In addition, carriage 109 moves from the 10's to the unit's position in preparation for printing the unit's digit. Printing mechanism 162 is unaffected by the conditional subtraction of 8 from 3 inasmuch as it is improper. The result is the same when rotor A contacts contact 95. An attempt is made to subtract 4 from 3. However, when rotor A touches contact 96, the proper subtraction of 2 from 3 takes place and printing mechanism 162 is placed in readiness to print the numeral 2. Before this action occurs, however. the proper subtraction of 1 from 1 takes place during the time rotor A is in contact with contact 97. As a result of this second proper subtraction, a second signal in this printing cycle is received by printing mechanism 162. The effect is cumulative and printing mechanism 162 is thereby positioned to print the numeral 3. Numeral 3 is printed when rotor B makes contact with contact 98 and printing mechanism 162 is thereafter reset to 0 when rotor B touches contact 99.

Heretofore in great detail, the operation of calculator 10 in performing addition, subtraction, and printing has been explained. There remain to be discussed the multiplication and division operations. In the interest of brevity, multiplication and division will be treated fundamentally ignoring to a large extent much of the detailed explanation of procedures heretofore discussed.

*Operation of Calculator in Performing Multiplication*

Reference is made to FIGS. 1 and 2 wherein is represented the circuitry required for performing the multiplication operation. Initially it is assumed that the keyboard 11 and dynamic storage means 39 are clear. For the purpose of illustrating multiplication, the number 4 will be multiplied by the number 6. The first step is to insert the number 4 in keyboard 11. Multiplication key 15 is depressed thereby converting the decimal number 4 to its binary equivalent and recording the binary number 4 in storage track A of dynamic storage means 39. The number 6 is then inserted in keyboard 11 and the multiplication key 16 depressed. In depressing multiplication key 16, relay K3 is energized for coupling reproducing element 36 to adding circuit 74 through C gate 78. Rotor A of switch S1 is connected to ground through multiplication key 16. The act of depressing multiplication key 16 also energizes solenoid 101 thus starting reproducing element 36 on its translation from right to left. During the course of its translation the number 6 is recorded in track C by recording element 44C. At the conclusion of its translation, switch S9 is closed as usual but keyboard 11 keys are not reset at this time since multiplication key 16 does not provide the necessary connection to ground. Switch S2a is opened, de-energizing solenoid 101. Switch S2b is closed, energizing relay K4 and stepping the rotors to position 2 thereby removing the ground connection from solenoid 101 and enabling reproducing element 36 to return to its initial inactive position. In this position, arm 145 is in contact with plunger 137 thereby closing switches S3 and S6. While in "addition" this act at the conclusion of the first translation had no effect on the movement of reproducing element 36, in multiplication switch S3 is an active element and governs the subsequent movement of reproducing element 36. Switch S3 in multiplication is coupled to ground through rotor A of switch S1 and key 16. Switch S3, when closed, energizes relay K4. The rotors on switch S1 are moved from contact position 2 to position 3. Switch S6 remains inactive electrically because its circuit path is coupled to rotor C of switch S1 and rotor C is coupled to division key 18 which does not provide a path to ground. When switch S1 is stepped to position 3, solenoid 101 is again energized through rotor B thus activating reproducing element 36 for a second translation.

Before describing the sequence of events that follow as a result of the switching action just described, the multiplication procedure will be briefly discussed. In binary multiplication the rules followed are analogous to those found in decimal multiplication. However, because of the existence of only two digits, the procedure is substantially simplified. For example, to multiply the numbers 4 and 6, the binary operation is shown in Equation 3:

$$\begin{array}{r} \ldots\ldots 00100 \ (4) \\ \ldots\ldots 00110 \ (6) \\ \hline 00000 \\ 00100 \\ 00100 \\ \hline 0011000 \ (24) \end{array} \qquad (3)$$

In Equation 3 the following steps were performed. The multiplicand is multiplied in sequence by each digit of the multiplier. In each case a "subproduct" is obtained and each subproduct is offset from the previous subproduct by one digit position. The total product is obtained by adding together the subproducts. In Equation 3 a subproduct is offset from a previous subproduct by one digit in the direction of higher order digits. Clearly, the result would be the same if each subproduct is offset from the subsequent subproduct one digit in the direction of lower order digits. Calculator 10 operates in this latter mode of operation. Calculator 10 further totals each subproduct to the previous subproduct immediately, thereby maintaining at all times only the sum of the previous subproducts. The end result, of course, is the same, the total of all the subproducts or the product of the multiplication.

In this second phase of multiplication, reproducing element 36, during the second translation, merely acts as a device for counting the revolutions of drum 30, for initiating the several multiplication operations, and for terminating these operations. From the previous discussion it is recalled that the multiplicand was inserted in storage track A and the multiplier is stored in storage track C. As reproducing element 36 commences the second translation, both of these numbers are rotating in synchronism in their respective storage tracks. As reproducing element 36 enters the storage means 31, arm 145 attached thereto closes switch S7 and switch S4. Switch S7 energizes relay K4 through rotor A on switch S1 stepping switch S1 to position 4. In position 4, switch S4 is able to complete the circuit to relay K6A energizing relay K6A. Relay K6 is preferably a latching relay comprising two coils A and B. In a typical latching relay operation, relay contacts assume one of two alternative positions depending upon which coil has been energized. Energizing relay K6A places the contacts of relay K6 in the positions other than those indicated for these contacts in FIG. 2. In addition to the routine function of switching signal paths, relay K6 by means of relay contacts K6–3 and K6–4 disconnects recording elements 44C and 44D, respectively, from the signal path and couples to the signal path the offset recording elements 46C and 46D. Recording elements 46C and 46D are offset from recording elements 44C and 44D, respectively, by one storage area in a counterclockwise direction. The effect of placing recording elements in this position is to provide the shifting action required in multiplication.

To illustrate, pulse signals, simultaneously reproduced in reproducing element 43A of storage track A and in reproducing element 43C of storage track C, are simultaneously re-recorded in their respective tracks by means of their respective recording elements. However, the effect of the offset recording element 46C is to record the pulse signal in storage track C one binary digit position ahead of the pulse signal being recorded in track A by recording element 44A. Consequently, during the next one-half revolution of both of these tracks, the pulse signal in storage track C is reproduced one binary digit ahead of the signal in storage track A. The pulse signal in storage track C is, therefore, reproduced ahead of the pulse signal in storage track A. Furthermore, it is re-recorded once again in the advanced position by the offset recording element 46C. Consequeuntly, at the time that the pulse signal in storage track A is reproduced and recorded, the pulse signal in storage track C is now two binary digits in advance. Manifestly, if the process continues, the pulse signal in storage track C will advance one binary position over the pulse signal in storage track A for each one-half revolution of drum 30 or each calculator cycle. If, instead of one pulse signal, we have a signal comprising time-spaced pulses representing a binary number in each track and, further, if we assume that the start of a cycle is represented by the appearance of the first binary digit of the number stored in storage track A, it is clear that at the beginning of each cycle a different binary digit of the number stored in storage track C is reproduced simultaneously with the first digit of the number stored in track A. By virtue of the fact that recording element 46C is advanced by only one digit position, the digits comprising the number stored in storage track C appear sequentially under reproducing element 43C at the start of each cycle when the first digit of the number stored in storage track A appears on the reproducing element 43A.

Referring again to the point in the operation at the end of the return of reproducing element 36 to its initial inactive position (corresponding to the start of the multiplication), the multiplicand 4 stored in storage track A is in synchronism with the multiplier 6 stored in storage track C. During the initial eleven half revolutions of drum 30 reproducing element 36 is merely transferred to storage means 31. During this transitional period the multiplicand 4 and the multiplier 6 are re-recorded simultaneously in their respective tracks. In multiplication, the reproducing element is inactive electrically and arm 145 acts as a revolutions counter. At significant intervals, arm 145 actuates several switching operations governing the actions of multiplicand 4 and mutiplier 6. In the dynamic storage means 39, the simultaneous synchronism of the multiplier and the multiplicand is maintained until the translation passes to the first register. At this point arm 145 depresses plunger 134 closing switches S7 and S4 as previously mentioned. Switch S7 steps rotors of switch S1 to position 4. Switch S4 thereupon energizes relay K6A by completing the circuit path for relay K6A to ground through position 4 of rotor A and key 16. The shifting action and the multiplication operation commence at this time. As the numbers recorded in storage tracks A and C appear under their respective reproducing elements and relay K6A has been energized, the offset recording elements 46C and 46D, for example, are connected to the signal path. Relay contact K6–2 is closed coupling F gate 73 to reproducing element 114. In the initial cycle of the multiplication, the first digit of binary number 6 stored in storage track C is reproduced simultaneously with the first digit of binary number 4 stored in storage track A. In the example under consideration this digit is a "0" and, consequently, no signal is presented to the input terminal 76 of adding circuit 74. The second input terminal 75 of adding circuit 74 also does not receive a signal because the action of relay contact K6–1 uncouples reproducing element 36 from the circuit path to adding circuit 74. Therefore, the first digit stored in storage track C is a "0" and is offset in a manner previously described. From FIG. 2 it is seen that the "0" coupled to recording element 46C is also coupled to an input circuit of F gate 73. Since the "0" is represented by the absence of a signal F gate 73, which requires the simultaneous application of two signals at its input terminals, is not enabled at this time. It will be assumed temporarily that as a result of F gate 73 remaining disabled, a "0" is recorded in the first binary digit position in track D. On the second cycle of the multiplication the second digit of binary number 6, a "1," is reproduced simultaneously with the first digit of binary number 4 in storage track A because of the shifting action heretofore described. The reproduced "1" digit is coupled through amplifier 86 and adding circuit 74 to recording element 46C thereby shifting the first digit "0" of binary number 6 in track C by two positions. The output terminal of adding circuit 74 is also coupled to F gate 73. The arrival of the "1" digit signal at F gate 73 is simultaneous with the arrival of the synchronizing first pulse signal from reproducing element 114 of synchronization track 113. Consequently, F gate 73 is enabled and a signal is coupled to gate generator 72 thereby activating gate generator 72. The output signal from gate generator 72 is a gate signal whose duration is equal to the time required for drum 30 to rotate one-half revolution through one calculator cycle. The gate signal from gate generator 72 is coupled to G gate 70 enabling G gate 70 for one-half revolution of drum 30 or one calculator cycle. The entire sequence of events including the reproduction of the "1" digit by reproducing element 43C through the enabling of G gate 70 is accomplished substantially instantaneously. Consequently, G gate 70 is enabled at the instant that reproducing element 43A is starting to reproduce the binary number 4. Binary number 4 is coupled through G gate 70 and C gate 82 to terminal 105 of adding circuit 104. The first digit of binary number 4 is offset one digit position from the first digit of the multiplicand 4 in track A. The "0" recorded in track D previously is offset by two binary digit positions. Consequently, the binary number derived from adding circuit 104 is as shown in Equation 4:

$$\begin{array}{r} 0\ (0) \\ 0100\ (4) \\ \hline 01000\ (8) \end{array} \quad (4)$$

Binary number 4 is also coupled through amplifier 84, A gate 59, and reversing circuit 56 to adding circuit 50. As the first digit of binary number 4 appears on the reproducing element 43A on the third calculator cycle, the third binary digit "1" of binary number 6 appears under the reproducing element 43C. The presence of the "1" digit at reproducing element 43C and, correspondingly, at F gate 73 initiates the previously described gating action enabling G gate 70 for one cycle. Consequently, binary number 4 from reproducing element 43A is coupled through G gate 70 to the input of adding circuit 104. At this time the third binary digit of the subproduct 8 stored in storage track D is coupled to the input terminal of adding circuit 104. At the inputs of adding circuit 104 the first digit of binary number 4 is added to the third digit of the subproduct 8 as indicated in Equation 5:

$$\begin{array}{r} 001000\ (8) \\ 0100\ \ \ (4) \\ \hline 011000\ (24) \end{array} \quad (5)$$

thereby giving a total equaling a binary product 24. Product 24 is recorded in storage track D by recording element 46D. The steps just described are repeated for each subsequent digit of the multiplier stored in storage track C. The subsequent binary digits are all 0's because the multiplier is binary number 6 which contains merely two 1's in the number 2 and number 4 positions. Accordingly, G gate 70 is not enabled for the remainder of the multiplication operation. The shifting action, however, is maintained and the number stored in storage track D is shifted one digit position for each cycle until the first digit of the product 24 stored in storage track D is once again aligned with the first digit of the multiplicand 4 stored in storage track A. Since there are twenty-two binary digits to each register, twenty-two steps are required. Sixteen are accounted for by the translation through storage means 31. The remaining six are performed in the translation beyond storage means 31. At this time, reproducing element 36 has completed the second translation and arm 145 depresses plunger 136. Switch S2a is opened thereby de-energizing solenoid 101, and switch S2b is closed thereby stepping the rotors of switch S1 to position 5 enabling reproducing element 36 to return to its initial inactive position. At the same time switch S2b is closed, switch S5 is closed activating relay K6B thereby returning the contacts to their initial positions as represented in FIG. 2. The signal paths to storage tracks C and D are now coupled to recording elements 44C and 44D, respectively. Recording elements 44C and 44D are not offset. Therefore, the numbers stored in these tracks are maintained in synchronism with the number stored in storage track A. During the return to the inactive position arm 145 depresses plunger 134. Switch S7 closes energizing relay K4 thereby causing the rotors of switch S1 to pass from contact position 5 to contact position 6. Relay K5 is energized thereby through rotor A. The switching action connects adding circuit 50 to amplifier 87 in the reproducing circuit of storage track D. Consequently, the product stored therein is recorded in storage track A through adding circuit 50, reversing circuit 53, and recording element 44A. It is seen from FIG. 2 that the circuit path from reproducing element 43A to adding circuit 50 has been broken by switching relay contact K5-1. The product, therefore, must be re-recorded in storage track A each half revolution of the storage track. Provision for doing this exists in the form of a periodic transfer of the product from reproducing element 43D, associated with storage track D, to recording element 44A on storage track A. Arm 145 finally reaches plunger 137 closing switch S3 which steps switch S1 to position 7, completing the circuit path for reset mechanism 139 through rotor D of switch S1 to ground in multiplication key 16. When the keyboard is reset at the end of the multiplication operation, relay contact K5-1 reverts to its former position thereby closing the circuit between reproducing element 43A and recording element 44A. Means for re-recording the product stored in storage track A every half revolution of storage track A is thereby established.

Although plunger 135 is depressed by arm 145 during each translation, the switches S8 and S10 associated therewith are passive in multiplication since they are coupled to rotor C of switch S1. Rotor C functions electrically only in division.

In calculator 10, as in other conventional calculating machines, multiplication may take place between any two decimal numbers whose product will not go beyond the inherent capabilities of the machine. In calculator 10, in particular, the product exceeding four decimal digits cannot be handled. Consequently, for the purposes of this application, multiplication may be performed between any two numbers each containing two decimal digits. The capabilities of the machine may, of course, be increased without changing the mode of operation discussed herein and by merely providing an additional keyboard and storage space.

*Operation of Calculator in Performing Division*

In performing division on many types of commercial calculators, the operator is instructed to insert the numbers employed in the calculation by means of the higher order keys. This procedure is necessary in order that a maximum number of significant figures can be obtained in the quotient. Another procedure widely used is to ignore the existence of decimal points and each number is treated as an integer. The procedure in binary division is analogous to that used in decimal division. In the first instance, the dividend is subtracted by a subtrahend which equals the divisor multiplied by a number which is a multiple of the divisor. The subtrahend developed in this manner is equal or less than equal in magnitude to the dividend. The usual procedure in decimal division is to subtract the divisor from the highest order digits in the dividend from which it is capable of being subtracted.

$$\begin{array}{r} 104\phantom{0} \\ 12\overline{)1248} \\ 12\phantom{00} \\ \hline 04\phantom{0} \\ 00\phantom{0} \\ \hline 48 \\ 48 \\ \hline 00 \end{array} \quad (6)$$

For example, in Equation 6 illustrated above, number 1248 is to be divided by 12. In the first instance, the divisor 12 is subtracted from the two highest order digits in the dividend. In this case these digits also constitute the number 12. The difference resulting from this subtraction is 0 and in a conventional manner the number 4 is brought down from the dividend for the next subtraction by the divisor. Clearly, this cannot be done and the number 8 is brought down from the dividend. At this point the number 12 multiplied by 4 is subtracted from the remaining digits of the dividend and a suitable subtraction is performed. Two important features of this operation are to be observed. In the first place, the divisor or a suitable multiple thereof is offset one digit in a direction of lower order digits of the dividend for each subtraction, proper or improper. Secondly, the divisor 12 was first presented to the dividend with its highest order digit aligned with the highest order digit of the dividend. These two steps are universally practiced in decimal division.

The division process for calculator 10 will be illustrated by dividing the binary number 24 by the binary number 6. The binary division is illustrated in Equations 7(a)–(c), inclusive:

$$
\begin{array}{r}
0 \\
(6)\ 0110\overline{)00011000}\ (24) \\
0110 \\
\hline
1011 \qquad 7(a)
\end{array}
$$

$$
\begin{array}{r}
00 \\
(6)\ 0110\overline{)00011000}\ (24) \\
0110 \\
\hline
1101 \qquad 7(b)
\end{array}
$$

$$
\begin{array}{r}
00100\ (4) \\
(6)\ 0110\overline{)00011000}\ (24) \\
0110 \\
\hline
0000 \qquad 7(c)
\end{array}
$$

Initially, in Equation 7(a) the highest order digit of the divisor 6 is aligned beneath the highest order digit in the dividend 24 and the first conditional subtraction is attempted. This first subtraction is manifestly improper and a 0 is duly recorded as the highest order digit of the quotient. The divisor is then shifted one binary digit position toward the lower order digit of the dividend and a second subtraction attempted in Equation 7(b). Recalling the conditional subtraction techniques previously discussed, it is seen that this second subtraction is also improper and as a result a 0 is recorded in the quotient. The divisor is shifted one further digit and a third subtraction attempted as illustrated in Equation 7(c). The subtraction is now possible with a difference, 0000 in the example, resulting. Subsequent subtraction will, of course, be improper and in this manner the quotient, binary number 4, is determined. In binary arithmetic, the number of 0's following the highest order 1 are of no significance in determining the magnitude of a number and ordinarily are of no consequence in arithmetical operations, multiplications for example. In binary division, it is necessary that the highest order digit of the divisor be aligned beneath the highest order digit of the dividend for the first subtraction. As the number of digits in the divisor will vary, this procedure requires proper orientation in accordance with the number of digits present in the divisor. As a practical matter, in calculator 10, as in other calculators, the number of binary digits in the divisor will be limited to half the number of digits contained in the dividend. In calculator 10 a full register has been assumed to contain twenty-two binary digits corresponding to twenty-two storage areas. Of these twenty-two storage areas only the first fourteen are of any significance since a maximum of fourteen binary digits is required to make up the number 9999. The remaining eight storage areas are in excess and up until this discussion served no useful function. In addition, it can be seen from FIG. 3b that the binary number 900 requires merely eleven binary digits in its make-up. Consequently, the dividend, if inserted by means of the highest order keys, ten-key unit 12D for example, contains twenty-two binary digits. On the other hand, the highest decimal number available through the utilization of the next to the highest order keys, ten-key unit 12C for example, contains a maximum of eleven binary digits. The highest order decimal digit in the dividend is inserted by means of ten-key unit 12D and the highest order decimal digit in the divisor is inserted by means of ten-key unit 12C.

In calculator 10 the numbers stored in respective storage tracks are usually synchronized such that their first and successive binary digits in respective numbers appear simultaneously under reproducing or recording elements. However, in order to start a division problem, it is necessary to align the highest order digit of the dividend. In order to meet this objective, prior to the start of the successive conditional subtractions the divisor will be stepped ahead eleven binary digit positions and in this manner bring the dividend and divisor into proper alignment for the start of the conditional subtraction. The manner in which this is accomplished is to activate the previously shifting function for eleven half revolutions of drum 30. It is recalled that the shifting function will advance the binary number stored within a particular track one binary digit for each one-half revolution of drum 30. Manifestly, if eleven steps precede the conditional subtraction process, the dividend and divisor will be properly aligned.

The details concerning the procedure just discussed are as follows. The dividend 24 and the divisor 6 are inserted within storage track A and storage track C, respectively, in the manner previously described under multiplication except that division buttons 17 and 18 are used. After inserting the divisor 6 in storage track C, arm 145 is returned to its initial inactive position depressing plunger 137 and closing switches S3 and S6. Switch S3 simultaneously steps rotary switch S1 to position 3 and starts a second translation of arm 145. Switch S6, on the other hand, energizes relay K6A through rotor C and position 3 of switch S1 coupling offset recording elements 46C and 46D into the signal path. Reproducing element 36 is translated parallel to drum 30 for an interval corresponding to eleven half revolutions of drum 30. With each half revolution, the divisor stored in track C has been shifted forward one binary digit position by the offset element. At the end of this interval, the conditional subtraction operation commences when switches S4 and S7 are depressed. Switch S4 has no effect at this time since the circuit path for this switch is coupled through rotor A of switch S1. Rotor A of switch S1 is an active element in multiplication only. However, switch S7 at this time energizes relay K4 stepping rotor C to the number 4 contact position thereby energizing relay K9. Relay K9 programs the circuitry in calculator 10 for conditional subtraction of the dividend stored in storage track A by the divisor stored in storage track C. Relay K9 further couples offset recording element 47D in the signal path. The reproducing element 43C is coupled through amplifier 86 and relay contact K9–1 to C gate 49. From C gate 49, the divisor is coupled to terminal 51 of adding circuit 50. The dividend is coupled through reproducing element 43A, amplifier 84, and A gate 59 to reversing circuit 56. Relay K1 has been energized by the depression of key 18 and as a consequence a reversed signal is obtained from reversing circuit 56. The reversed signal represents the 1's complement of the dividend and it is coupled to adding circuit 50. The resulting sum is coupled to reversing circuit 53 where the 1's complement of the resulting sum is obtained. As heretofore described, the 1's complement of the summation developed in adding circuit 50 represents the difference in the conditional subtraction operation. In an identical manner to that described in conditional subtraction, the calculator 10 performs a series of conditional subtractions employing the dividend stored in track A and the divisor stored in track C. As a result of each proper subtraction, a single pulse is developed at the output of E gate 81. This again is in accordance with the conditional subtraction technique heretofore described. A portion of the signal output from E gate 81 is coupled through relay contact K9–2 and C gate 82 to terminals of adding circuit 104. Initially, no signal is available at terminal 106 of adding circuit 104 from storage track D because storage track D up to this point is free of any stored signals. Consequently, the signal derived from adding circuit 104, which is coupled to offset recording element 47D through relay contact K9–4, is the identical single pulse derived from E gate 81.

Recalling that the output signal from E gate 81 occurs at a time when the last binary digit is being reproduced, the orientation of the signals stored in the respective storage tracks from a viewpoint of synchronization will be discussed. The input signal to storage track D from E gate 81 occurs in the last binary digit position of the register. Offset recording element 47D, by the nature of its physical location, shifts signals reproduced and recorded in storage track D one digit behind a nonshifting signal, dividend 24 for example, each half revolution of drum 30. In division, the first digit derived in the quotient represents the highest order digit of the quotient while the last digit derived in the quotient represents the lowest order digit. Equation 8 below illustrates the last conditional subtraction operation performed in the assumed problem:

$$\begin{array}{rl} 0 & 0000000010 \quad (4) \\ 00000000000000011000 & (24) \\ 00000000110 & (6) \end{array} \quad (8)$$

A "0" is stored in storage track D in the last digit position of the register. As a consequence of the shifting action of recording element 47D, the higher order digits of the quotient, previously described, appear in the first digit position of storage track D as represented in Equation 8. Manifestly, if one additional shifting cycle is performed, the quotient will be in synchronism with the unstepped dividend.

Eleven calculator cycles are required to develop the quotient and one extra cycle for synchronizing the quotient with the dividend. Twelve cycles correspond to the translation of arm 145 to a position directly over plunger 135. Plunger 135 is depressed closing switches S8 and S10. Switch S8 steps rotary switch S1 to position 5, de-energizing relay K9 and energizing relay K5. Switch S10 energizes relay K6B returning all associated contacts to the positions indicated in FIG. 2. The switching action performed by relays K6B and K9 terminates the conditional subtraction operation and the shifting actions. The quotient is now maintained in synchronism with the dividend and is further periodically transferred through relay contact K5–1 to storage track A. Arm 145 is returned to its inactive position and switch S1 is stepped to position 6 thereby energizing reset mechanism 139 resetting all keys on keyboard 11. When the keys are reset, the quotient is re-recorded in a typical manner and maintained in storage track A pending the printing cycle. At the end of the second translation of arm 145, plunger 136 is depressed thereby energizing relay contact K6B. The recording function for storage track D is once again performed by recording element 44C, a nonoffset element. The quotient stored in storage track D is re-recorded thereafter without a shifting action and in synchronism with other nonshifting signals. When arm 145 returns to its initial inactive position, relay K5 is energized by the shifting action of switch S1 and the quotient is translated through relay contact K5–1 to an input of adding circuit 50. The output from adding circuit 50 is a reproduction of the quotient input and is recorded in storage track A. When the keys are reset, the quotient is re-recorded in a typical manner and maintained therein pending the printing cycle.

Figure 6A:
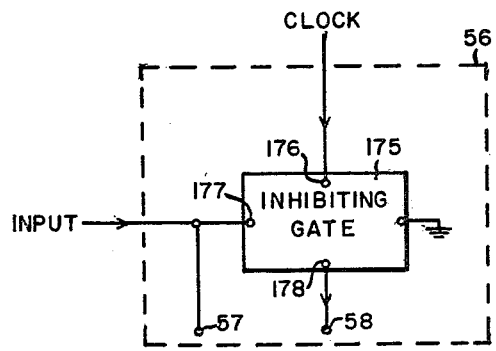
FIG. 6a is a circuit diagram of a reversing circuit.
Figure 6B:
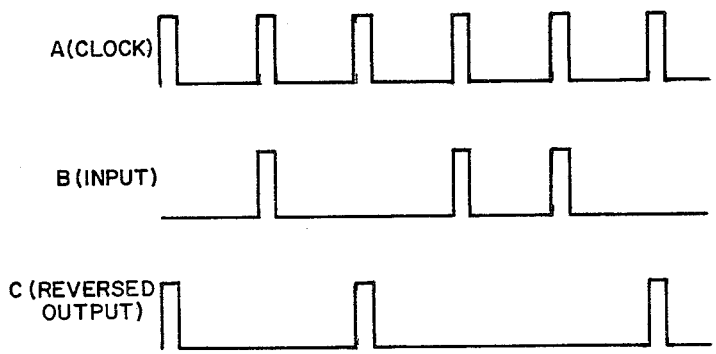

The principal operations of calculator 10 have been fully described. In the process of preparing the description, the construction details and operation of reversing circuits 56 and 53 were neglected. Reference is now made to FIG. 6a wherein is represented the construction details of reversing circuit 56. Reversing circuit 56 comprises an inhibiting gate 175 containing input terminals 176 and 177 and an output terminal 178. Clock signals are coupled from the clock synchronization track 113 in FIG. 2 to the input terminal 176. Inhibiting gate 175 normally translates the clock signals applied at terminal 176 to the output terminal 178 unless prevented from doing so. The presence of a signal at input terminal 177 will inhibit the translation of the clock pulses. In the present invention the input signals consist of signals representing a binary number reproduced from storage track A. The binary input signal in typical fashion is comprised of signal pulses at a predetermined time representing a digit "1." A "1" pulse applied to input terminal 177 will prevent the passage of the clock pulses through inhibiting gate 175 whereas a clock pulse will pass in the absence of a "1" signal. Consequently, the signal output from terminal 178 is related to the input signal in that a pulse is absent in the output where a pulse existed in the input signal. Also, a pulse is present in the output where a pulse was absent in the input signal. In other words, the 1's and 0's of the outputs are in a reversed order from the 1's and 0's of the input signal. Referring now to FIG. 6b, curve A represents the clock input signals to terminal 176 of inhibiting gate 175. Curve B represents an arbitrary binary signal applied to terminal 177 of inhibiting gate 175. Curve C represents the output signal derived from terminal 178. In comparing curve B with curve C it is seen that the positions of the 1's and 0's have been reversed. Curve C also represents the 1's complement of the input signal and is available at the terminal of relay K1 connected to terminal 178 of inhibiting gate 175.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a calculator for performing arithmetic computations: insertion means for inserting information corresponding to numbers to be utilized in a calculation and for controlling the following transfer means; means for storing information representing all numbers which may be so utilized in a plurality of registers arranged serially along a path; transfer means including a reproducing element capable of traversing said path and actuated by the insertion means for successively reproducing and transferring to the following dynamic storage means during each traversal of a register any information stored in the register corresponding to the information so inserted; and dynamic storage means for storing the so transferred information as an accumulation as each register is so traversed including means for reproducing the accumulation with each traversal of a new register and adding the reproduced accumulation to the information transferred from the new register and recording the sum as a new accumulation and means for erasing the accumulation after each such reproduction.

2. In a calculator for performing arithmetic computations: insertion means including a plurality of electrical devices for inserting information corresponding to numbers to be utilized in a calculation by conditioning selected ones of said devices; means including a recording medium having a portion for permanently storing information representing all numbers which may be so utilized in a plurality of registers arranged serially along a path; transfer means including a reproducing element capable of traversing said path and a sensing element capable of traversing each of said devices in a fixed relationship to the traversal of said registers by said reproducing element and being actuated by the selected devices for successively reproducing and transferring to the following dynamic storage means during each traversal of a register any information stored in the register corresponding to the information represented by the respective selected devices; and dynamic storage means including a second portion in said recording medium in fixed relation to the first portion for storing the so transferred information as an accumulation as each register is so traversed including means for reproducing the accumulation with each traversal of a new register and adding the reproduced accumulation to the information transferred from the new register and recording the sum as a new accumulation and means for erasing the accumulation after each such reproduction.

3. In a decimal calculator for performing arithmetic computations in binary arithmetic: insertion means including means for performing decimal-to-binary conversion for inserting information corresponding to numbers to be utilized in a calculation and for controlling the following transfer means; means for storing binary information representing all numbers which may be so utilized in a plurality of registers arranged serially along a path; transfer means including a reproducing element capable of traversing said path and actuated by the insertion means for successively reproducing and transferring to the following dynamic storage means during each traversal of a register any information stored in the register corresponding to the information so inserted; and dynamic storage means for storing the so transferred information as an accumulation as each register is so traversed including means for reproducing the accumulation with each traversal of a new register and adding the reproduced accumulation to the information transferred from the new register and recording the sum as a new accumulation and means for erasing the accumulation after each such reproduction.

4. In a decimal calculator for performing arithmetic computations in binary arithmetic: insertion means including means for performing decimal-to-binary conversion and a plurality of electrical devices for inserting information corresponding to numbers to be utilized in a calculation by conditioning selected ones of said devices; means including a magnetic recording medium having a portion for permanently storing binary information representing all numbers which may be so utilized in a plurality of registers arranged serially along a path; transfer means including a reciprocating reproducing element capable of traversing said path and a sensing element capable of traversing each of said devices in a fixed relationship to the traversal of said registers by said reproducing element and being actuated by the selected devices for successively reproducing and transferring to the following dynamic storage means during each traversal of a register any information stored in the register corresponding to the information represented by the respective selected devices; and dynamic storage means including a second portion in said magnetic recording medium in fixed relation to the first portion for storing the so transferred information as an accumulation as each register is so traversed including means for reproducing the accumulation with each traversal of a new register and adding the reproduced accumulation to the information transferred from the new register and recording the sum as a new accumulation and means for erasing the accumulation after each such reproduction.

5. In a calculator for performing arithmetic computations: insertion means for inserting information corresponding to numbers to be utilized in a calculation and for controlling the following transfer means; means including a rotatable drum recording medium for storing information representing all numbers which may be so utilized in a plurality of registers arranged serially along a helical path on said medium; transfer means including a reproducing element movable axially of said medium for traversing said path and actuated by the insertion means for successively reproducing and transferring to the following dynamic storage means during each traversal of a register any information stored in the register corresponding to the information so inserted; and dynamic storage means including a rotatable drum recording medium for storing in a circumferential path thereon the so transferred information as an accumulation as each register is so traversed including means for reproducing the accumulation with each traversal of a new register and adding the reproduced accumulation to the information transferred from the new register and recording the sum as a new accumulation and means for erasing the accumulation after each such reproduction.

6. In a decimal calculator for performing arithmetic computations in binary arithmetic: insertion means including means for performing decimal-to-binary conversion and a plurality of electrical devices for inserting information corresponding to numbers to be utilized in a calculation by conditioning selected ones of said devices; means including a rotatable magnetic drum recording medium having a portion for permanently storing binary information representing all numbers which may be so utilized in a plurality of registers arranged serially along a helical path on said medium; transfer means including a reciprocating reproducing element movable axially of said medium for traversing said path and a sensing element capable of traversing each of said devices in a fixed relationship to the traversal of said registers by said reproducing element and being actuated by the selected devices for successively reproducing and transferring to the following dynamic storage means during each traversal of a register any information stored in the register corresponding to the information represented by the respective selected devices; and dynamic storage means including a second portion in a circumferential path in said recording medium in fixed relation to the first portion for storing the so transferred information as an accumulation as each register is so traversed including means for reproducing the accumulation with each traversal of a new register and adding the reproduced accumulation to the information transferred from the new register and recording the sum as a new accumulation and means for erasing the accumulation after each such reproduction.

7. In a calculator for performing arithmetic computations: insertion means for successively inserting information to successive numbers to be utilized in a calculation and for controlling the following transfer means; means for storing information representing all numbers which may be so utilized in a plurality of registers arranged serially along a path; transfer means including a reproducing element capable of traversing said path once per insertion and actuated by the insertion means for successively reproducing and transferring to the following dynamic storage means during each traversal information stored in the registers and corresponding to the information so inserted; and dynamic storage means for storing the so transferred information as an accumulation as each register is so traversed including means for reproducing the accumulation with each traversal of a new register and adding the reproduced accumulation to the information transferred from the new register and recording the sum as a new accumulation and means for erasing the accumulation after each such reproduction.

8. In a decimal calculator for performing arithmetic computations in binary arithmetic: insertion means including means for performing decimal-to-binary conversion and a plurality of electrical devices for successively inserting information corresponding to successive numbers to be utilized in a calculation by conditioning selected ones of said devices; means for storing binary information representing all numbers which may be so utilized in a plurality of registers arranged serially along a path; transfer means including a reciprocating reproducing element capable of traversing said path once per insertion and a sensing element capable of traversing each of said devices in a fixed relationship to the traversal of said registers by said reproducing element and being actuated by the selected devices for successively reproducing and transferring to the following dynamic storage means during each traversal information stored in the registers and corresponding to the information represented by the respective selected devices; and dynamic storage means for storing the so transferred information as an accumulation as each register is so traversed including means for reproducing the accumulation with each traversal of a new register and adding the reproduced accumulation to the information transferred from the new register and recording the sum as a new accumulation and means for erasing the accumulation after each such reproduction.

9. In a calculator for performing arithmetic computations: insertion means for successively inserting information corresponding to sucessive numbers to be utilized in a calculation and for controlling the following transfer means; a rotatable drum having information representing all numbers which may be utilized stored in a plurality of registers arranged serially along a helical path running circumferentially around the drum; transfer means including a reciprocating reproducing element capable of reciprocating parallel to the axis of the drum so as to traverse said path and actuated by the insertion means for reproducing and transferring selected information stored thereon to the following dynamic storage means; and dynamic storage means including a rotatable drum recording medium for storing in a circumferential path thereon the so transferred information as an accumulation as each register is so traversed including means for reproducing the accumulation with each traversal of a new register and adding the reproduced accumulation to the information transferred from the new register and recording the sum as a new accumulation and means for erasing the accumulation after each such reproduction.

10. In a decimal calculator for performing arithmetic computations in binary arithmetic: insertion means including means for performing decimal-to-binary conversion for successively inserting information corresponding to successive numbers to be utilized in a calculation and for controlling the following transfer means; a rotatable magnetic drum recording medium having binary information representing all numbers which may be utilized permanently stored in a plurality of registers arranged serially along a helical path running circumferentially around a portion of the drum; transfer means including a reciprocating reproducing element capable of reciprocating parallel to the axis of the drum so as to traverse said path and actuated by the insertion means for reproducing and transferring selected information stored thereon to the following dynamic storage means; and dynamic storage means including a second portion in a circumferential path in said recording medium in fixed relation to the first portion for storing the so transferred information as an accumulation as each register is so traversed including means for reproducing the accumulation with each traversal of a new register and adding the reproduced accumulation to the information transferred from the new register and recording the sum as a new accumulation and means for erasing the accumulation after each such reproduction.

11. In a calculator for performing arithmetic subtractions: insertion means for inserting information corresponding to numbers to be utilized in a subtraction and for controlling the following transfer means; means for storing information representing all numbers which may be so utilized in a plurality of registers arranged serially along a path; transfer means including a reproducing element capable of traversing said path and actuated by the insertion means for successively reproducing and transferring to the following dynamic storage means during each traversal of a register any information stored in the register corresponding to the information so inserted; and dynamic storage means for storing the so transferred information as a cumulative difference as each register is so traversed including a dynamic storage track for storing some of the so transferred information, means for reproducing the information in said storage track with each traversal of a new register and combining it subtractively with the information transferred from the new register and recording the difference in the storage track, and means for erasing the information in the storage track after each such reproduction.

12. In a decimal calculator for performing subtractions in binary arithmetic: insertion means including means for performing decimal-to-binary conversion for inserting information corresponding to numbers to be utilized in a subtraction and for controlling the following transfer means; means including a circulating magnetic recording medium having a portion for permanently storing binary information representing all numbers which may be so utilized in a plurality of registers arranged serially along a path; transfer means including a reproducing element capable of traversing said path and actuated by the insertion means for successively reproducing and transferring to the following dynamic storage means during each traversal of a register any information stored in the register corresponding to the information so inserted; and dynamic storage means including a second portion in said recording medium in fixed relation to the first portion for storing the so transferred information in a path which circulates as a cumulative difference as each register is so traversed including a dynamic storage track for storing some of the so transferred information, means for reproducing the information in said storage track with each traversal of a new register and combining it subtractively with the information transferred from the new register and recording the difference in the storage track, and means for erasing the information in the storage track after each such reproduction.

13. In a calculator for performing arithmetic subtractions: insertion means including a plurality of electrical devices for inserting information corresponding to numbers to be utilized in a subtraction by conditioning selected ones of said devices; means including a rotatable drum recording medium for storing information representing all numbers which may be so utilized in a plurality of registers arranged serially along a helical path on said medium; transfer means including a reciprocating reproducing element movable axially of said medium for traversing said path and a sensing element capable of traversing each of said devices in a fixed relationship to the traversal of said registers by said reproducing element and being actuated by the selected devices for successively reproducing and transferring to the following dynamic storage means during each traversal of a register any information stored in the register corresponding to the information represented by the respective selected devices; and dynamic storage means including a rotatable drum recording medium for storing in a circumferential path thereon the so transferred information as a cumulative difference as each register is so traversed including a dynamic storage track for storing some of the so transferred information, means for reproducing the information in said storage track with each traversal of a new register and combining it subtractively with the information transferred from the new register and recording the difference in the storage track, and means for erasing the information in the storage track after each such reproduction.

14. In a calculator for performing arithmetic subtractions: insertion means for successively inserting information corresponding to successive numbers to be utilized in a subtraction and for controlling the following transfer means; means including a recording medium including a portion for permanently storing information representing all numbers which may be so utilized in a plurality of registers arranged serially along a path; transfer means including a reproducing element capable of traversing said path once per insertion and actuated by the insertion means for successively reproducing and transferring to the following dynamic storage means during each traversal of a register any information stored in the register corresponding to the information so inserted; and dynamic storage means including a second portion in said recording medium in fixed relation to the first portion for storing the so transferred information as a cumulative difference as each register is so traversed including a dynamic storage track for storing some of the so transferred information, means for reproducing the information in said storage track with each traversal of a new register and combining it subtractively with the information transferred from the new register and recording the difference in the storage track, and means for erasing the information in the storage track after each such reproduction.

15. In a calculator for performing arithmetic multiplications: insertion means for inserting information corresponding to the numbers to be utilized in the multiplication and for controlling the following transfer means; means for storing information representing all numbers which may be so utilized in a plurality of registers arranged serially along a path; transfer means including a reproducing element capable of traversing said path and actuated by the insertion means for successively reproducing and transferring to the following first and second dynamic storage means during each traversal of a register any information stored in the register corresponding to the information so inserted; first dynamic storage means for storing the so transferred information as an accumulation as each register is so traversed including means for reproducing the accumulation with each traversal of a new register and adding the reproduced accumulation to the information transferred from the new register and recording the sum as a new accumulation, and means for erasing the accumulation after each such reproduction, the final accumulation representing multiplicand information; second dynamic storage means for so accumulating multiplier information; third dynamic storage means for accumulating product information; and circuit means responsive to said multiplicand and multiplier information for recording the product information in said third dynamic storage means.

16. In a decimal calculator for performing multiplications in binary arithmetic: insertion means including means for performing decimal-to-binary conversion and a plurality of electrical devices for inserting information corresponding to the numbers to be utilized in the multiplication by conditioning selected ones of said devices; means including a circulating magnetic recording medium having a portion for permanently storing binary information representing all numbers which may be so utilized in a plurality of registers arranged serially along a path; transfer means including a reciprocating reproducing element capable of traversing said path and a sensing element capable of traversing each of said devices in a fixed relationship to the traversal of said registers by said reproducing element and being actuated by the selected devices for successively reproducing and transferring to the following first and second dynamic storage means during each traversal of a register any information stored in the register corresponding to the information represented by the respective selected devices; first dynamic storage means including a second portion in said recording medium in fixed relation to the first portion for storing the so transferred information, in a path, which circulates, as an accumulation as each register is so traversed including means for reproducing the accumulation with each traversal of a new register and adding the reproduced accumulation to the information transferred from the new register and recording the sum as a new accumulation, and means for erasing the accumulation after each such reproduction, the final accumulation representing multiplicand information; second dynamic storage means including a third portion in said recording medium in fixed relationship to the first portion for so accumulating multiplier information; third dynamic storage means including a fourth portion in said recording medium in fixed relationship to the first portion for accumulating product information; and circuit means responsive to said multiplicand and multiplier information for recording the product information in said third dynamic storage means.

17. In a calculator for performing arithmetic multiplications: insertion means for inserting information corresponding to the numbers to be utilized in the multiplication and for controlling the following transfer means; means including a rotatable drum recording medium for storing information representing all numbers which may be so utilized in a plurality of registers arranged serially along a helical path on said medium; transfer means including a reciprocating reproducing element movable axially of said medium for traversing said path and actuated by the insertion means for successively reproducing and transferring to the following first and second dynamic storage means during each traversal of a register any information stored in the register corresponding to the information so inserted; first dynamic storage means including a rotatable drum recording medium for storing in a circumferential path thereon the so transferred information as an accumulation as each register is so traversed including means for reproducing the accumulation with each traversal of a new register and adding the reproduced accumulation to the information transferred from the new register and recording the sum as a new accumulation, and means for erasing the accumulation after each such reproduction, the final accumulation representing multiplicand information; second dynamic storage means including a rotatable drum recording medium and a circumferential storage path thereon for so accumulating multiplier information; third dynamic storage means for accumulating product information in a circumferential path on a rotatable recording medium; and circuit means responsive to said multiplicand and multiplier information for recording the product information in said third dynamic storage means.

18. In a calculator for performing arithmetic multiplications: insertion means including a plurality of electrical devices for successively inserting information corresponding to successive numbers to be utilized in the multiplication by conditioning selected ones of said devices; means including a recording medium including a portion for permanently storing information representing all numbers which may be so utilized in a plurality of registers arranged serially along a path; transfer means including a reciprocating reproducing element capable of traversing said path once per insertion and a sensing element capable of traversing each of said devices in a fixed relationship to the traversal of said registers by said reproducing element and being actuated by the selected devices for successively reproducing and transferring to the following first and second dynamic storage means during each traversal of a register any information stored in the register corresponding to the information represented by the respective selected devices; first dynamic storage means including a second portion in said recording medium in fixed relation to the first portion for storing the so transferred information as an accumulation as each register is so traversed including means for reproducing the accumulation with each traversal of a new register and adding the reproduced accumulation to the information transferred from the new register and recording the sum as a new accumulation, and means for erasing the accumulation after each such reproduction, the final accumulation representing multiplicand information; second dynamic storage means including a third portion in said recording medium in fixed relation to the first portion for so accumulating multiplier information, third dynamic storage means including a fourth portion in said recording medium in fixed relation to the first portion for accumulating product information; and circuit means responsive to said multiplicand and multiplier information for recording the product information in said third dynamic storage means.

19. In a calculator for performing arithmetic division: insertion means for inserting information corresponding to the numbers to be utilized in the division and for controlling the following transfer means; means for storing information representing all numbers which may be so utilized in a plurality of registers arranged serially along a path; transfer means including a reproducing element capable of traversing said path and actuated by the insertion means for successively reproducing and transferring to the following first and second dynamic storage means during each traversal of a register any information stored in the register corresponding to the information so inserted; first dynamic storage means for storing the so transferred information as an accumulation as each register is so traversed including means for reproducing the accumulation with each traversal of a new register and adding the reproduced accumulation to the information transferred from the new register and recording the sum as a new accumulation, and means for erasing the accumulation after each such reproduction, the final accumulation representing dividend information; second dynamic storage means for so accumulating divider information; third dynamic storage means for accumulating quotient information; and circuit means responsive to said dividend and divider information for recording the quotient information in said third dynamic storage means.

20. In a calculator for performing arithmetic division: insertion means including a plurality of electrical devices for inserting information corresponding to the numbers to be utilized in the division by conditioning selected ones of said devices; means including a rotatable drum recording medium for storing information representing all numbers which may be so utilized in a plurality of registers arranged serially along a helical path on said medium; transfer means including a reproducing element movable axially of said medium for traversing said path and a sensing element capable of traversing each of said devices in a fixed relationship to the traversal of said registers by said reproducing element and being actuated by the selected devices for successively reproducing and transferring to the following first and second dynamic storage means during each traversal of a register any information stored in the register corresponding to the information represented by the respective selected devices; first dynamic storage means including a rotatable drum recording medium for storing in a circumferential path thereon the so transferred information as an accumulation as each register is so traversed including means for reproducing the accumulation with each traversal of a new register and adding the reproduced accumulation to the information transferred from the new register and recording the sum as a new accumulation, and means for erasing the accumulation after each such reproduction, the final accumulation representing dividend information; second dynamic storage means including a rotatable drum recording medium and a circumferential storage path thereon for so accumulating divider information; third dynamic storage means for accumulating quotient information in a circumferential path on a rotatable recording medium; and circuit means responsive to said dividend and divider information for recording the quotient information in said third dynamic storage means.

21. In a calculator for performing arithmetic division: insertion means including a plurality of electrical devices for successively inserting information corresponding to successive numbers to be utilized in the division by conditioning selected ones of said devices; means including a recording medium including a portion for permanently storing information representing all numbers which may be so utilized in a plurality of registers arranged serially along a path; transfer means including a reciprocating reproducing element capable of traversing said path once per insertion and a sensing element capable of traversing each of said devices in a fixed relationship to the traversal of said registers by said reproducing element and being actuated by the selected devices for successively reproducing and transferring to the following first and second dynamic storage means during each traversal of a register any information stored in the register corresponding to the information represented by the respective selected devices; first dynamic storage means including a second portion in said recording medium in fixed relation to the first portion for storing the so transferred information as an accumulation as each register is so traversed including means for reproducing the accumulation with each traversal of a new register and adding the reproduced accumulation to the information transferred from the new register and recording the sum as a new accumulation, and means for erasing the accumulation after each such reproduction, the final accumulation representing dividend information; second dynamic storage means including a third portion in said recording medium in fixed relation to the first portion for so accumulating divider information; third dynamic storage means including a fourth portion in said recording medium in fixed relation to the first portion for accumulating quotient information; and circuit means responsive to said dividend and divider information for recording the quotient information in said third dynamic storage means.

22. In a decimal calculator for performing arithmetic division in binary arithmetic: insertion means including means for performing decimal-to-binary conversion and a plurality of electrical devices for successively inserting information corresponding to the successive numbers to be utilized in the division by conditioning selected ones of said devices; a rotatable magnetic drum recording medium having binary information representing all numbers which may be so utilized permanently stored in a plurality of registers arranged serially along a helical path running circumferentially around a portion of the drum; transfer means including a reciprocating reproducing element capable of reciprocating parallel to the axis of the drum so as to traverse said path and a sensing element capable of traversing each of said devices in a fixed relationship to the traversal of said registers by said reproducing element and being actuated by the selected devices for successively reproducing and transferring to the following first and second dynamic storage means during each traversal of a register any information stored in the register corresponding to the information represented by the respective selected devices; first dynamic storage means including a second portion in said recording medium having a circumferential path in fixed relation to the first path for storing the so transferred information as an accumulation as each register is so traversed including means for reproducing the accumulation with each traversal of a new register and adding the reproduced accumulation to the information transferred from the new register and recording the sum as a new accumulation, and means for erasing the accumulation after each such reproduction, the final accumulation representing dividend information; second dynamic storage means including a third portion in said recording medium having a circumferential path in fixed relation to the first path for so accumulating divided information; third dynamic storage means including a fourth portion in said recording medium having a circumferential path in fixed relation to the first path for accumulating quotient information; and circuit means responsive to said dividend and divider information for recording the quotient information in said third dynamic storage means.

23. In a calculator for performing arithmetic computations: insertion means for inserting information corresponding to numbers to be utilized in a calculation; means for storing information representing all numbers which may be so utilized in a plurality of registers arranged serially along a path; transfer means including a reproducing element capable of traversing said path for reproducing and transferring to the following dynamic storage means during each traversal of a register selected information stored in the registers; dynamic storage means responsive to selected transferred information for developing and storing an answer including means for reproducing and again so storing the answer with each traversal of a register and means for erasing the answer after each such reproduction; means for causing said reproducing element to traverse said path for conditionally subtracting numbers in the plurality of registers from the answer stored in the dynamic storage means until the answer is reduced to zero; and means responsive to the conditional subtraction for indicating the answer.

24. In a calculator for performing arithmetic computations: insertion means for inserting information corresponding to numbers to be utilized in a calculation; means for storing information representing all numbers which may be so utilized in a plurality of registers arranged serially along a path; a reproducing element capable of traversing said path for reproducing and transferring to the following dynamic storage means during each traversal of a register selected information stored in the registers; dynamic storage means including first and second tracks and responsive to selected transferred information for developing and storing an answer as a minuend signal in the first track and including means for reproducing and again so storing the answer with each traversal of a register and means for erasing the answer after each such reproduction; means for causing said reproducing element to traverse said path for conditionally subtracting as subtrahend signals numbers in the plurality of registers from the answer stored in the dynamic storage means until the answer is reduced to zero including means for subtracting the subtrahend signals from the minuend signal and causing the difference signal produced to be stored in the first and second tracks and means for alternatively selecting as the next succeeding minuend signal the difference signal stored in the first track when the minuend exceeds the subtrahend or the minuend signal stored in the second track when the subtrahend exceeds the minuend; and means responsive to the conditional subtraction for indicating the answer.

25. In a calculator for performing arithmetic computations: insertion means for inserting information corresponding to numbers to be utilized in a calculation; means including a rotatable drum recording medium for storing information representing all numbers which may be so utilized in a plurality of registers arranged serially along a helical path on said medium; a reproducing element movable axially of said medium for traversing said path for reproducing and transferring to the following dynamic storage means during each traversal of a register selected information stored in the registers; dynamic storage means including a rotatable drum recording medium including first and second circumferential tracks and responsive to selected transferred information for developing and storing an answer as a minuend signal in the first track and including means for reproducing and again so storing the answer with each traversal of a register and means for erasing the answer after each such reproduction; means for causing said reproducing element to traverse said path for conditionally subtracting as subtrahend signals numbers in the plurality of registers from the answer stored in the dynamic storage means until the answer is reduced to zero including means for subtracting the subtrahend signals from the minuend signal and causing the difference signal produced to be stored in the first and second tracks and means for alternatively selecting as the next succeeding minuend signal the difference signal stored in the first track when the minuend exceeds the subtrahend or the minuend signal stored in the second track when the subtrahend exceeds the minuend; and means responsive to the conditional subtraction for indicating the answer.

26. A calculator for performing arithmetic computations: insertion means for inserting information corresponding to a number to be utilized in a calculation and for controlling the following transfer means; means for storing information representing all numbers which may be so utilized in a plurality of registers arranged serially along a path; transfer means including a reproducing element capable of traversing said path and actuated by the insertion means for successively reproducing and transferring to the following dynamic storage means during each traversal of a register any information stored in the register corresponding to the information so inserted; dynamic storage means responsive to the so transferred information for developing and storing an answer including means for reproducing and again storing the answer with each traversal of a new register and means for erasing the answer after each such reproduction; means for causing said reproducing element to traverse said path for conditionally subtracting the numbers in the plurality of registers from the so stored answer until the answer is reduced to zero; and a recording mechanism responsive to the conditional subtraction for printing each digit of the answer at the time the digit is determined by the conditional subtraction.

27. A decimal calculator for performing arithmetic computations in binary arithmetic: insertion means including means for performing decimal-to-binary conversion for inserting information corresponding to a number to be utilized in a calculation and for controlling the following transfer means; means including a circulating magnetic recording medium having a portion for permanently storing binary information representing all numbers which may be so utilized in a plurality of registers arranged serially along a path; transfer means including a reproducing element capable of traversing said path and actuated by the insertion means for successively reproducing and transferring to the following dynamic storage means during each traversal of a regitser any information stored in the register corresponding to the information so inserted; dynamic storage means responsive to the so transferred information including a second portion in said recording medium in fixed relation to the first portion for developing and storing a binary answer, in a path which circulates, including means for reproducing and again storing the binary answer with each traversal of a new register and means for erasing the binary answer after each such reproduction; means for causing said reproducing element to traverse said path for conditionally subtracting the numbers in the plurality of registers from the so stored binary answer until the binary answer is reduced to zero; and a recording mechanism responsive to the conditional subtraction for converting the binary answer to a decimal answer and printing each decimal digit of the answer at the time the decimal digit is determined by integration of its corresponding binary information in the conditional subtraction.

28. A calculator for performing arithmetic computations: insertion means including a plurality of electrical devices for inserting information corresponding to a number to be utilized in a calculation by conditioning selected ones of said devices; means including a rotatable drum recording medium for storing information representing all numbers which may be so utilized in a plurality of registers arranged serially along a helical path on said medium; transfer means including a reciprocating reproducing element movable axially of said medium for transversing said path and sensing element capable of transversing each of said devices in a fixed relationship to the traversal of said registers by said reproducing element and being actuated by the selected devices for successively reproducing and transferring to the following dynamic storage means during each traversal of a register any information stored in the register corresponding to the information represented by the respective selected devices; dynamic storage means responsive to the so transferred information including a rotatable drum recording medium for developing and storing an answer in a circumferential path thereon including means for reproducing and again storing the answer with each traversal of a new register and means for erasing the answer after each such reproduction; means for causing said reproducing element to traverse said path for conditionally subtracting the numbers in the plurality of registers from the so stored answer until the answer is reduced to zero; and a recording mechanism responsive to the conditional subtraction for printing each digit of the answer at the time the digit is determined by the conditional subraction.

29. A calculator for performing arithmetic computations: insertion means for successively inserting information corresponding to successive numbers to be utilized in a calculation and for controlling the following transfer means; means including a recording medium including a portion for permanently storing information representing all numbers which may be so utilized in a plurality of registers arranged serially along a path; transfer means including a reciprocating reproducing element capable of traversing said path once per insertion and actuated by the insertion means for successively reproducing and transferring to the following dynamic storage means during each traversal of a register any information stored in the register corresponding to the information so inserted; dynamic storage means responsive to the so transferred information including a second portion in said recording medium in fixed relation to the first portion for developing and storing an answer including means for reproducing and again storing the answer with each traversal of a new register and means for erasing the answer after each such reproduction; means for causing said reproducing element to traverse said path for conditionally subtracting the numbers in the plurality of registers from the so stored answer until the answer is reduced to zero; and a recording mechanism responsive to the conditional subtraction for printing each digit of the answer at the time the digit is determined by the conditional subtraction.

30. A decimal calculator for performing arithmetic computations in binary arithmetic: insertion means including means for performing decimal-to-binary conversion and a plurality of electrical devices for successively inserting information corresponding to successive numbers to be utilized in a calculation by conditioning selected ones of said devices; a rotatable magnetic drum recording medium having binary information representing all numbers which may be so utilized permanently stored in a plurality of registers arranged serially along a helical path running circumferentially around a portion of the drum; transfer means including a reciprocating reproducing element capable of reciprocating parallel to the axis of the drum so as to traverse said path and a sensing element capable of traversing each of said devices in a fixed relationship to the traversal of said registers by said reproducing element and being actuated by the selected devices for successively reproducing and transferring to the following dynamic storage means during each traversal of a register any information stored in the register corresponding to the information represented by the respective selected devices; dynamic storage means responsive to the so transferred information including a second portion in a circumferential path on said recording medium in fixed relation to the first portion for developing and storing a binary answer including means for reproducing and again storing the binary answer with each traversal of a new register and means for erasing the binary answer after each such reproduction; means for causing said reproducing element to traverse said path for conditionally subtracting the numbers in the plurality of registers from the so stored binary answer until the binary answer is reduced to zero; and a recording mechanism responsive to the conditional subtraction for converting the answer to a decimal answer and printing each decimal digit of the answer at the time the decimal digit is determined by integration of its corresponding binary information in conditional subtraction.

References Cited in the file of this patent

UNITED STATES PATENTS

| | | |
|---|---|---|
| 2,255,622 | Landsiedel | Sept. 9, 1941 |
| 2,695,134 | Sunstrand | Nov. 23, 1954 |
| 2,940,669 | Hobbs | June 14, 1960 |
| 2,947,478 | Lentz et al. | Aug. 2, 1960 |
| 2,970,765 | Bird | Feb. 7, 1961 |
| 2,974,867 | Steele | Mar. 14, 1961 |
| 2,982,472 | Huskey | May 2, 1961 |